United States Patent
Sakuma

(10) Patent No.: US 7,123,646 B1
(45) Date of Patent: Oct. 17, 2006

(54) SYNCHRONOUS ACQUISITION DEVICE FOR CDMA RECEIVER

(75) Inventor: Emiko Sakuma, Tokyo (JP)

(73) Assignee: NEC Corporation, (JP)

( * ) Notice: Subject to any disclaimer, the term of this patent is extended or adjusted under 35 U.S.C. 154(b) by 824 days.

(21) Appl. No.: 10/070,617

(22) PCT Filed: Sep. 18, 2000

(86) PCT No.: PCT/JP00/06360

§ 371 (c)(1),
(2), (4) Date: Mar. 8, 2002

(87) PCT Pub. No.: WO01/22639

PCT Pub. Date: Mar. 29, 2001

(30) Foreign Application Priority Data

Sep. 20, 1999 (JP) .................................. 11-264872

(51) Int. Cl.
*H04L 27/30* (2006.01)
(52) U.S. Cl. ...................... 375/149; 375/147; 375/145; 370/342; 370/335
(58) Field of Classification Search ................ 375/142, 375/150, 367, 148, 134, 137, 143, 152, 260, 375/130, 343, 133, 135, 136, 140, 149, 144, 375/145, 147, 206, 208, 205; 370/335, 342, 370/336, 441, 442, 517, 350, 311, 320, 479; 708/250; 341/173
See application file for complete search history.

(56) References Cited

U.S. PATENT DOCUMENTS

| 4,404,645 A | | 9/1983 | Elings et al. | |
| 5,432,814 A | * | 7/1995 | Hasegawa | ................... 375/133 |
| 5,528,624 A | * | 6/1996 | Kaku et al. | ................. 375/148 |
| 5,638,362 A | * | 6/1997 | Dohi et al. | .................. 370/342 |
| 5,790,588 A | * | 8/1998 | Fukawa et al. | ............. 375/148 |
| 5,835,488 A | * | 11/1998 | Sugita | ......................... 370/342 |
| 5,970,084 A | * | 10/1999 | Honda | ........................ 370/342 |

(Continued)

FOREIGN PATENT DOCUMENTS

EP  0 749 223 A1  12/1996

(Continued)

OTHER PUBLICATIONS

A novel architecture design for multicode CDMA rake receiver□□Sangyun Hwang; et al; ASICs, 1999. AP-ASIC '99. The First IEEE Asia Pacific Conference on□□Aug. 23-25,1999 pp. 421-423.*

(Continued)

*Primary Examiner*—Temesghen Ghebretinsae
(74) *Attorney, Agent, or Firm*—Dickstein, Shapiro, LLP.

(57) ABSTRACT

A synchronous acquisition device for a small-circuit-scale CDMA receiver is provided. The synchronous acquisition device for a CDMA receiver, which receives as a receiver signal a spectrum-spread signal generated by spectrum-spreading, using a spreading code, transmission data including one of first to mth pieces (m: an integer 2 or more) of fixed data, comprises, for each of a plurality of paths into which the receiver signal is branched, a multiplier (21) for multiplying the receiver signal by the spreading code, an integrator (12) for one-symbol-time integrating an output signal from the multiplier (21), fixed data sequential output units (25$_1$ to 25$_m$, 24) having the first to mth pieces of fixed data and sequentially outputting the first to mth pieces of fixed data, and a second multiplier (23) for multiplying an output signal from the integrator (12) by the first to mth pieces of fixed data sequentially outputted from the fixed data sequential output units.

16 Claims, 9 Drawing Sheets

U.S. PATENT DOCUMENTS

| | | | | |
|---|---|---|---|---|
| 5,978,412 | A * | 11/1999 | Takai | 375/145 |
| 6,064,688 | A * | 5/2000 | Yanagi | 375/149 |
| 6,067,314 | A | 5/2000 | Azuma | |
| 6,069,915 | A * | 5/2000 | Hulbert | 375/150 |
| 6,097,712 | A * | 8/2000 | Secord et al. | 370/335 |
| 6,128,329 | A * | 10/2000 | Takakusaki | 375/140 |
| 6,154,487 | A * | 11/2000 | Murai et al. | 375/150 |
| 6,324,210 | B1 * | 11/2001 | Yang et al. | 375/152 |
| 6,353,627 | B1 * | 3/2002 | Schilling | 375/130 |
| 6,421,372 | B1 * | 7/2002 | Bierly et al. | 375/143 |
| 6,470,000 | B1 * | 10/2002 | Burns et al. | 370/342 |
| 6,611,512 | B1 * | 8/2003 | Burns | 370/342 |
| 6,625,199 | B1 * | 9/2003 | McDonough | 375/140 |
| 6,628,699 | B1 * | 9/2003 | Ramberg et al. | 375/148 |
| 6,850,507 | B1 * | 2/2005 | Ok | 370/335 |

FOREIGN PATENT DOCUMENTS

JP  10-173630  6/1998

OTHER PUBLICATIONS

Abstract of Japanese Application No. 08180719.
Copy of European Search Report dated Jan. 8, 2003.

* cited by examiner

FIG. 1
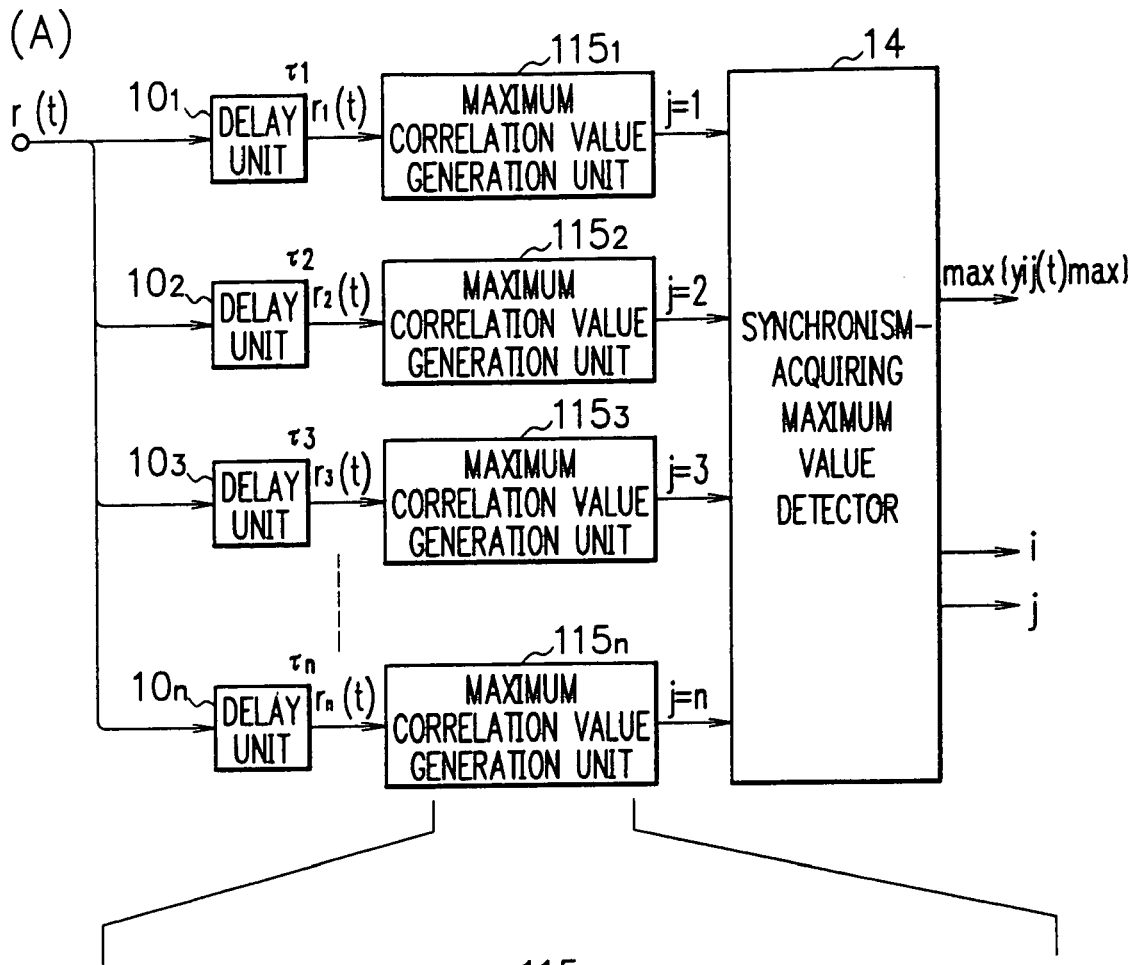
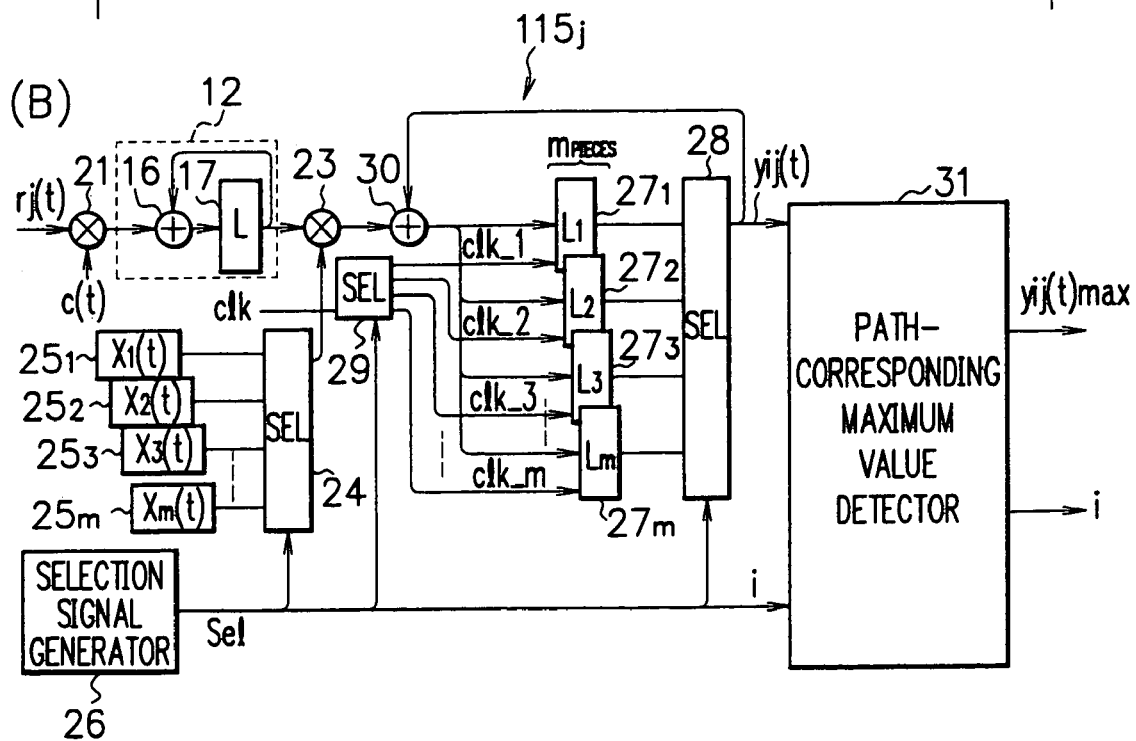

F I G. 3
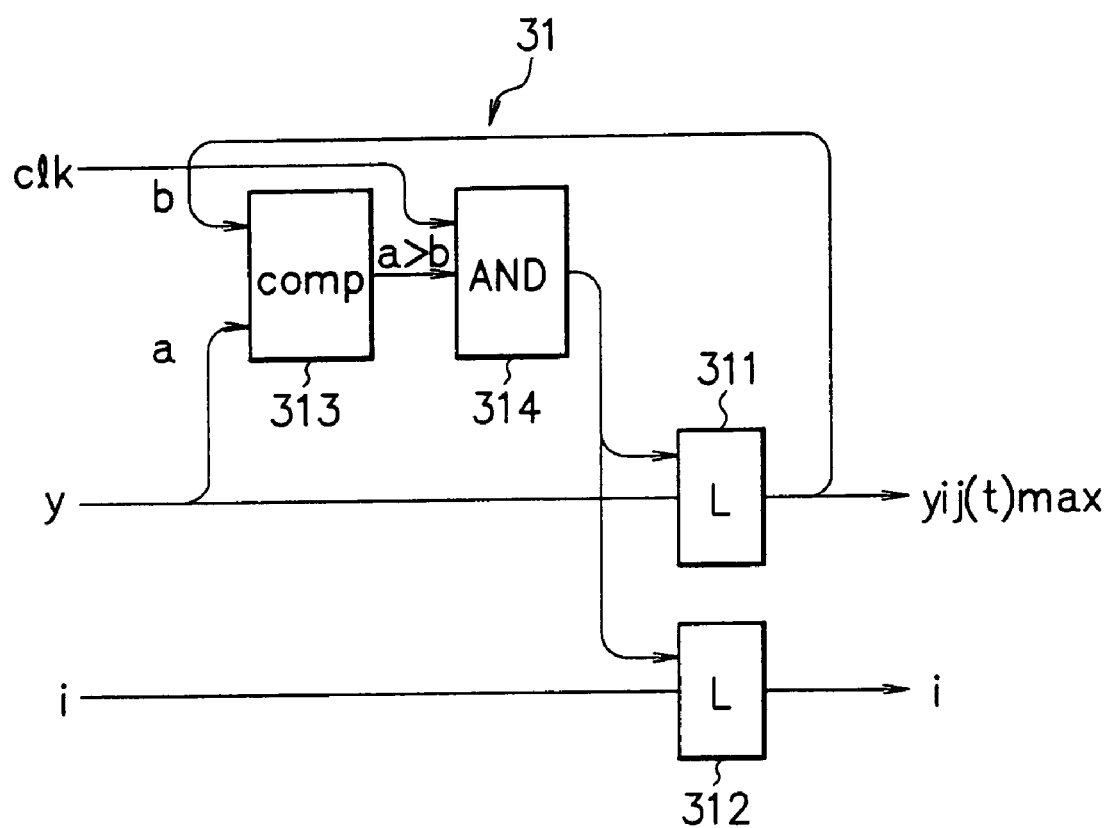

FIG. 4
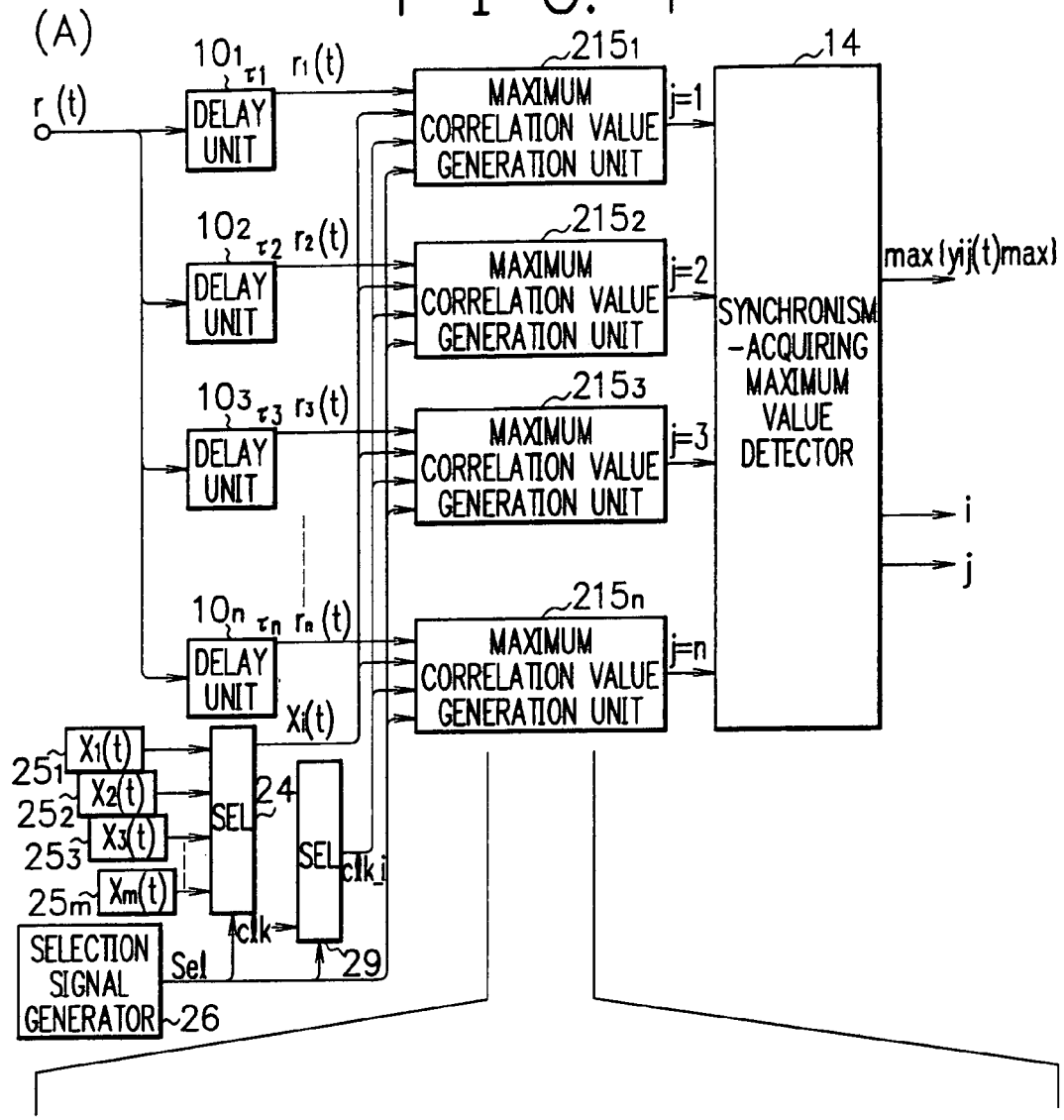
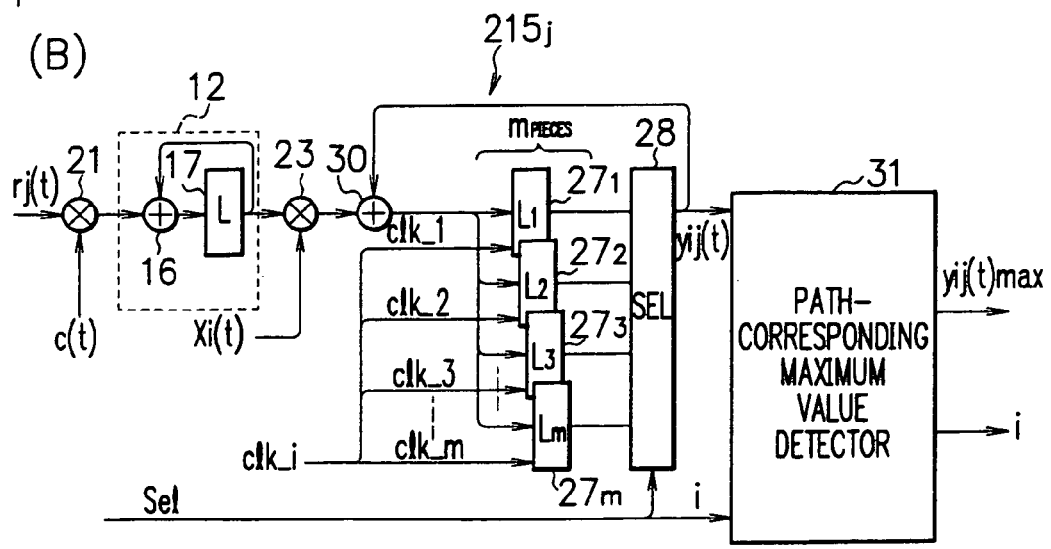

FIG. 5
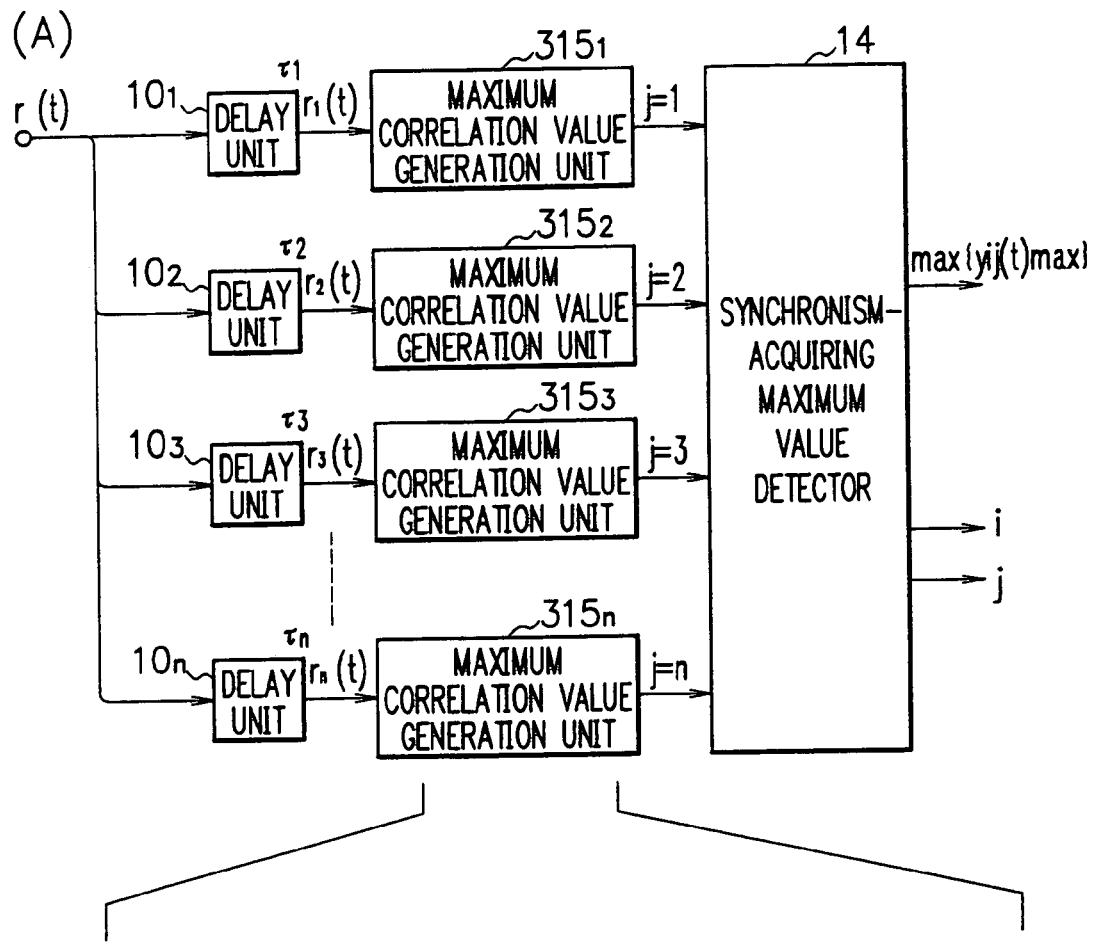
(A)
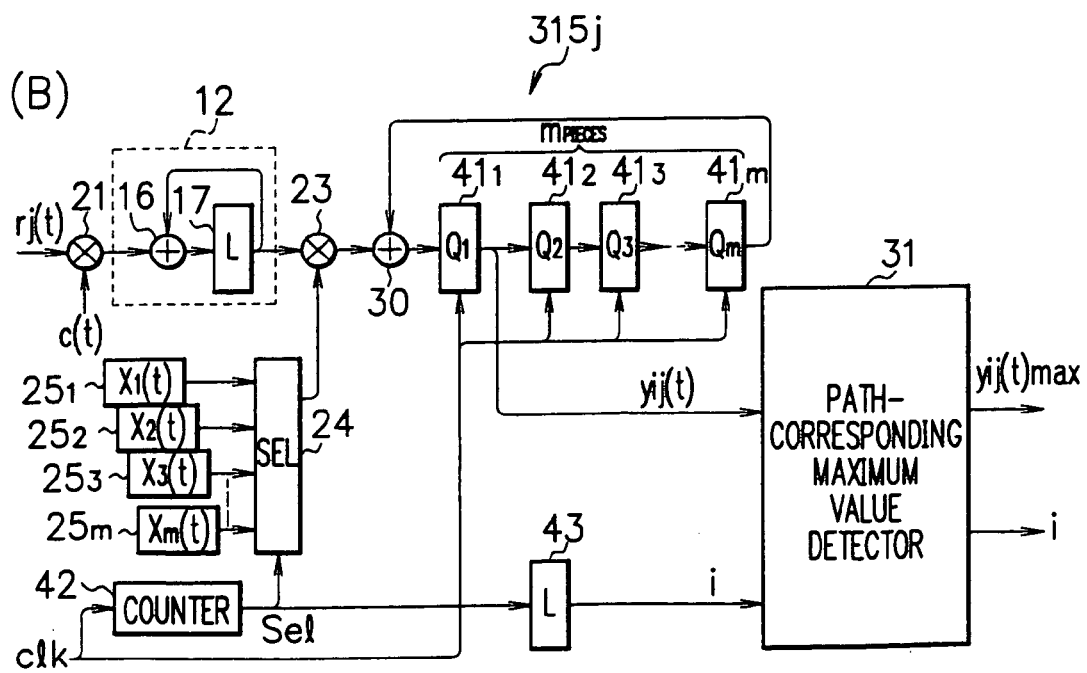
(B)

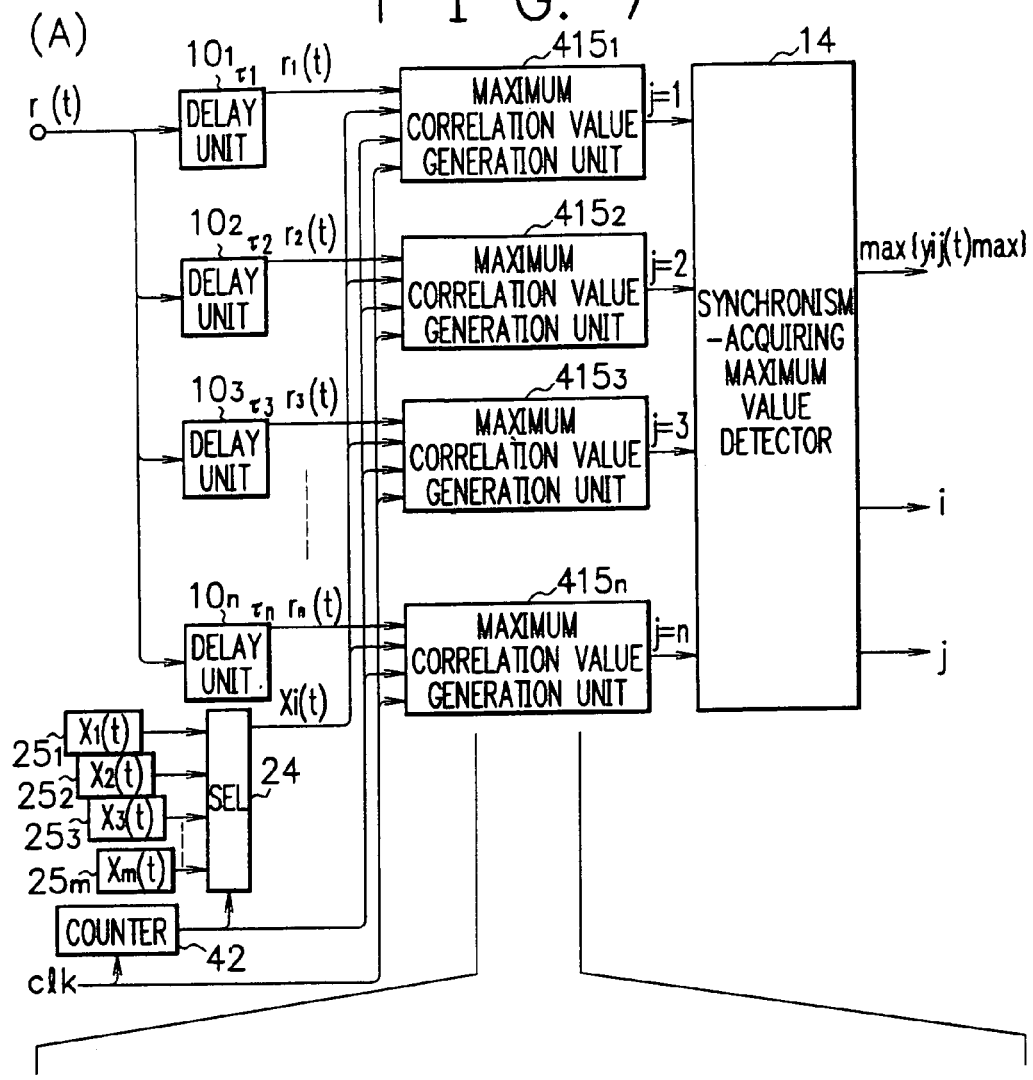
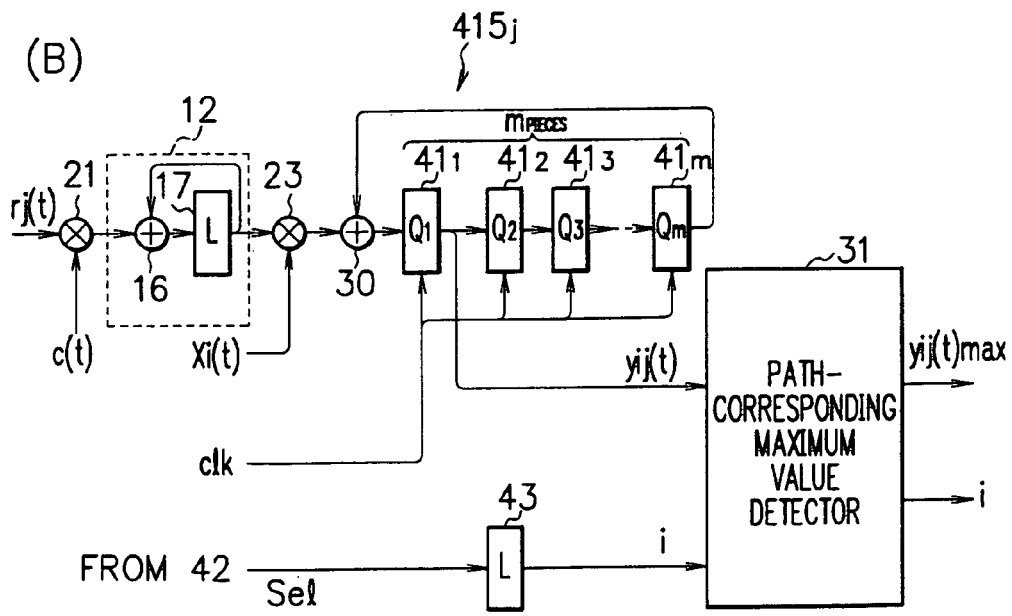
FIG. 7

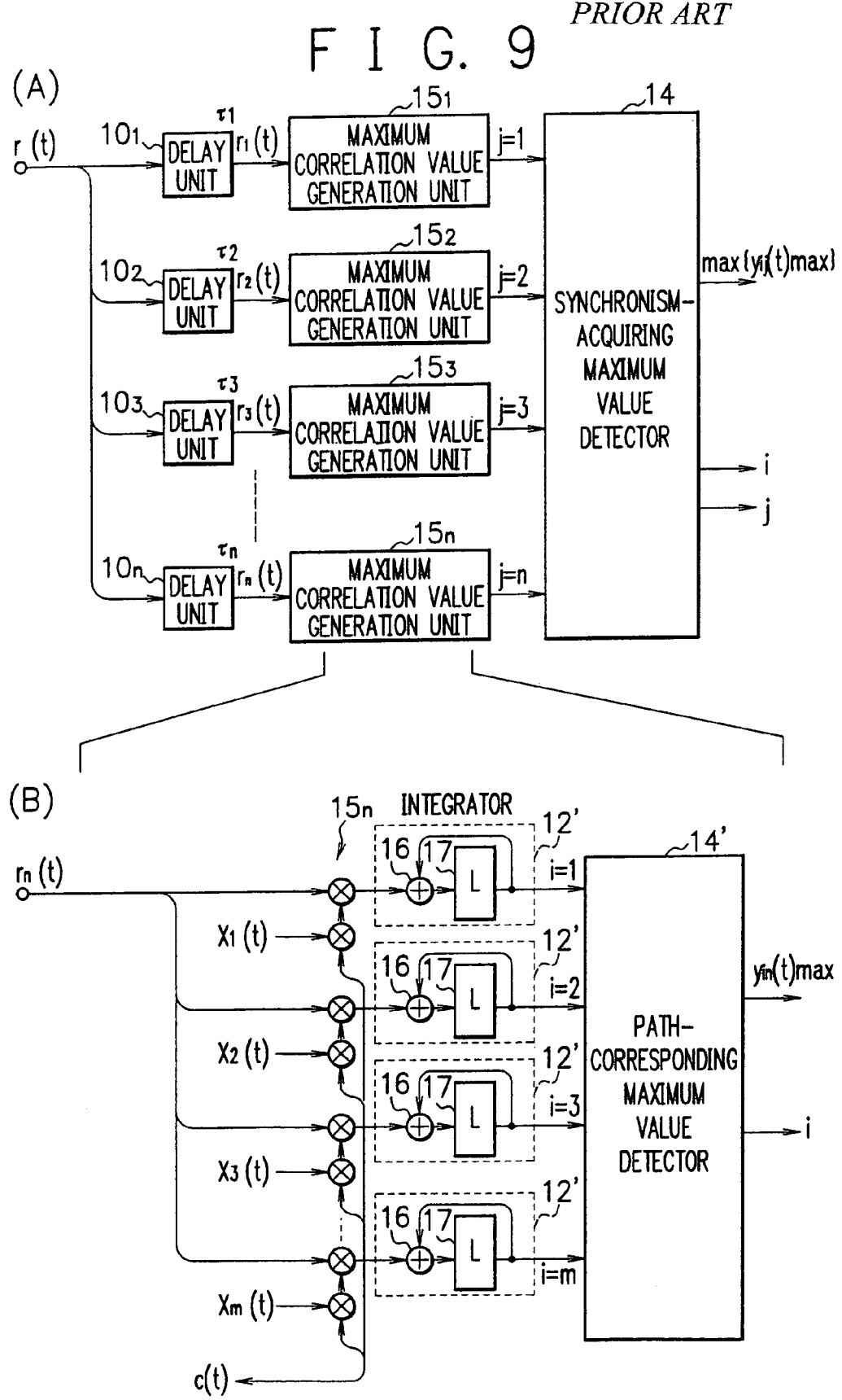

SYNCHRONOUS ACQUISITION DEVICE FOR CDMA RECEIVER

This application is a filing under 35 U.S.C. 371 of International Application No. PCT/JP00/06360, filed on Sep. 18, 2000, which was published in Japanese as WO 01/22639, and which claimed benefit of Japanese Application No. 264872/1999, filed on Sep. 20, 1999.

TECHNICAL FIELD

The present invention relates to a CDMA receiver, and more particularly to a synchronous acquisition device and a synchronous acquisition method for a CDMA receiver.

BACKGROUND ART

In the broadband CDMA (Code Division Multiple Access) system, which is expected to become a standard system for next-generation cellular phones, signals are spread over wide spectrum by using a spreading code, and thus enabling one frequency band to be shared by plural channels. In addition, there is another advantage of high secrecy. On the other hand, in the CDMA system, it is necessary to provide a receiver with a circuit for eliminating the spreading code differently from a conventional narrow-band modulation system, which enlarges the circuit size.

In a CDMA transmitter, transmission data D(t) are multiplied by a spreading code c(t) to be a spectrum-spread transmitter signal s(t), and thereby transmitted. The transmission data D(t) include a certain data sequence at the first part. The data are called fixed data and denoted by $x_i(t)$. The transmitter signal s(t) is sent through a transmission line and received by a CDMA receiver. The signal received at the CDMA receiver is denoted by r(t).

In the following, a description will be given of the case where data are transmitted by using one of plural pieces of fixed data $x_1(t), x_2(t), x_3(t), \ldots, x_m(t)$ as the above-mentioned fixed data $x_i(t)$ (m: an integer 2 or more; $1 \text{ (one)} \leq i \leq m$). The CDMA receiver is previously provided with the values of the plural pieces of fixed data $x_1(t), x_2(t), x_3(t), \ldots, x_m(t)$, however, unable to decide which one of the pieces of fixed data $x_1(t), x_2(t), x_3(t), \ldots, x_m(t)$ are to be sent.

FIG. 9(A) illustrates a conventional synchronous acquisition device for a CDMA receiver. The synchronous acquisition device includes first to nth paths (n: an integer 2 or more), which are supplied with first to nth branch signals obtained by branching a receiver signal r(t), respectively.

The synchronous acquisition device further includes first to nth delay units $10_1, 10_2, 10_3, \ldots, 10_n$ connected to the first to nth paths. The first to nth delay units $10_1, 10_2, 10_3, \ldots, 10_n$ output first to nth delayed signals $r_1(t), r_2(t), r_3(t), \ldots, r_n(t)$, respectively, by giving different amounts of delays $\tau_1, \tau_2, \tau_3, \ldots, \tau_n$ to each of the first to nth branch signals. That is, the jth branch signal that branches into the jth path of the first to nth paths ($1 \text{ (one)} \leq j \leq n$) is delayed by the jth delay unit $10_j$ and outputted as the jth delayed signal $r_j(t)$.

Subsequently, in the synchronous acquisition device, first to nth maximum correlation value generation units $15_1, 15_2, 15_3, \ldots, 15_n$ connected to the first to nth delay units $10_1, 10_2, 10_3, \ldots, 10_n$ generate first to nth maximum correlation values based on the first to nth delayed signals $r_1(t), r_2(t), r_3(t), \ldots, r_n(t)$.

Then, a synchronism-acquiring maximum value detector 14 connected to the first to nth maximum correlation value generation units $15_1, 15_2, 15_3, \ldots, 15_n$ detects a maximum value of the first to nth maximum correlation values to acquire synchronism.

FIG. 9(B) illustrates a detail of the nth maximum correlation value generation unit $15_n$ of the first to nth maximum correlation value generation units $15_1, 15_2, 15_3, \ldots, 15_n$ in the synchronous acquisition device shown in FIG. 9(A). The other maximum correlation value generation units have the same structure as that of the nth maximum correlation value generation unit $15_n$.

As shown in FIG. 9(B), the nth maximum correlation value generation unit $15_n$ branches a signal $r_n(t)$ delayed by the delay unit $10_n$ into paths of the same number as m pieces of fixed data (namely, first to mth paths) as first to mth branch signals, and the first to mth branch signals are inputted to first to mth correlation devices, respectively. The first to mth correlation devices multiply the first to mth branch signals by the products of the first to mth pieces of fixed data $x_1(t), \ldots, x_m(t)$ and the spreading code c(t), respectively, and integrate first to mth multiplication results by an integrator' 12 to output first to mth correlation values $y_{1n}(t), \ldots, y_{mn}(t)$. The first to mth correlation values $y_{1n}(t), \ldots, y_{mn}(t)$ outputted from the first to mth correlation devices get high when the first to mth branch signals are synchronized with the products of the first to mth pieces of fixed data $x_1(t), \ldots, x_m(t)$ and the spreading code c(t), when not, the values come low. A maximum value detector 14' corresponding to the path of the nth maximum correlation value generation unit $15_n$ detects a maximum value $y_{in}(t)$ max ($1 \text{ (one)} \leq i \leq m$) of the first to mth correlation values $y_{1n}(t), \ldots, y_{mn}(t)$ as the nth maximum correlation value. In more detail, the maximum value detector 14' corresponding to the path of the nth maximum correlation value generation unit $15_n$ outputs the maximum correlation value $y_{in}(t)$ max and i corresponding to the maximum correlation value $y_{in}(t)$ max.

To sum up, in FIG. 9(A), the jth ($1 \text{ (one)} \leq j \leq n$) maximum correlation value generation unit $15_j$ of the first to nth maximum correlation value generation units $15_1, \ldots, 15_n$ outputs the jth maximum correlation value $y_{ij}(t)$ max and i corresponding to the jth maximum correlation value $y_{ij}(t)$ max. The synchronism-acquiring maximum value detector 14 in FIG. 9(A) detects a maximum value max $\{y_{ij}(t)\text{max}\}$ of the maximum correlation values $y_{ij}(t)$ max ($1 \text{ (one)} \leq j \leq n$) to acquire synchronism, and outputs the detected maximum value max $\{y_{ij}(t)\text{max}\}$, and i and j corresponding to the maximum value max $\{y_{ij}(t)\text{max}\}$.

As is described above, inside the maximum correlation value generation units $15_1, 15_2, 15_3, \ldots, 15_n$ of FIG. 9(A), m integrators 12' are lined up in parallel, which makes circuit size very big.

Incidentally, as shown in FIG. 9(B), each of the integrators 12' includes an adder 16 for receiving an input signal at its first input terminal, and a delay element 17 composed of a latch L for delaying an output signal from the adder 16 by 1-symbol-time and outputting the delayed signal as an integrator output signal to input it to the second input terminal of the adder 16.

In the following, the operation of the synchronous acquisition device will be explained with reference to FIGS. 9(A) and 9(B).

Transmission data D(t) are expressed as follows:

$$D(t)=x_i(t) \ (0 \leq t < t_0)$$

$$D(t)=d(t) \ (t_0 \leq t) \quad (1)$$

In which d(t) denotes information data. That is, first ($0 \leq t < t_0$), the transmission data includes fixed data $x_i(t)$ (1 (one) $\leq i < m$), and subsequently ($t_0 \leq t$), includes the information data d(t). The information data d(t) need to be synchronized with the fixed data $x_i(t)$ when received.

A transmitter signal s(t) is obtained by multiplying the transmission data D(t) by a spreading code c(t). Assuming that $0 \leq t < t_0$ with regard to time t, the transmitter signal s(t) is expressed as:

$$s(t) = x_i(t)c(t) \quad (0 \leq t < t_0) \quad (2).$$

An output $y_{ij}(t)$ of the correlation device can be obtained by multiplying the receiver signal r(t)=s(t) by the spreading code c(t) and the fixed data $x_i(t)$ after giving a delay $\tau_j$ (1 (one) $\leq j \leq n$) in each path, and integrating the product by N-symbol-time as following expression. Then, a maximum value is detected among the paths to acquire synchronism.

$$y_{ij}(t) = \int_0^{t_0} r(t-\tau_j) x_i(t) c(t) dt \quad (3)$$

Problems that the Invention is to Solve

As is described above, in the CDMA transmitter, transmission data are multiplied by a spreading code to spread spectrum and thereby transmitted. The CDMA receiver synchronizes the spreading codes to restore the transmission data. On that occasion, a receiver signal is branched into n paths and given different amounts of delays in the respective paths, and further, the delayed signal of each path is branched to m pieces of fixed data to obtain a correlation value by an integrator. Consequently, it is necessary to provide the synchronous acquisition device of the CDMA receiver with (n×m) integrators, and also (n×m) adders for the respective integrators. Thus the circuit size increases.

There is disclosed in Japanese Patent Application Laid-Open No. HEI10-173630 a synchronous acquisition device, in which a receiver signal is not delayed but a spreading code is given different amounts of delays to obtain plural delayed spreading codes, and the plural spreading codes are fed to plural correlation devices, respectively. However, in the above patent application, the case where a CDMA transmitter transmits data by using one of plural pieces of fixed data for synchronization is unconsidered, and naturally neither the problem that the circuit size of the synchronous acquisition device for the CDMA receiver increases in such case nor a means for solving the problem is disclosed.

It is therefore an object of the present invention to provide a synchronous acquisition device for the CDMA receiver having a smaller circuit size, and a synchronous acquisition method achieved by the synchronous acquisition device.

DISCLOSURE OF THE INVENTION

In accordance with the present invention, there is provided a synchronous acquisition device for a CDMA receiver that receives as a receiver signal a signal transmitted by spectrum-spreading transmission data including one of first to mth pieces of fixed data using a spreading code, having a plurality of paths into which the receiver signal is branched, wherein each of the paths includes:

a first multiplier for multiplying the receiver signal by the spreading code;

a first integrator for integrating an output signal of the first multiplier by one-symbol-time;

fixed data sequential output units for having the first to mth pieces of fixed data and sequentially outputting the first to mth pieces of fixed data;

a second multiplier for multiplying an output signal from the first integrator by the first to mth pieces of fixed data outputted from the fixed data sequential output units, and sequentially outputting first to mth multiplication results;

correlation value sequential output units for sequentially outputting the first to mth multiplication results as first to mth correlation values; and a path-corresponding maximum value detector for detecting a maximum value of the first to mth correlation values.

Besides, in accordance with the present invention, there is provided a synchronous acquisition method for a CDMA receiver, including steps of:

branching an input signal into a plurality of branch signals;

delaying the plurality of branch signals each by different delay times;

multiplying the plurality of delayed signals by a spreading code;

integrating the plurality of multiplied signals by one-symbol-time;

multiplying the plurality of integrated signals by the kth symbols of first to mth pieces (m: an integer 2 or more) of fixed data each including first to Nth symbols (N: an integer two or more) sequentially one by one, and repeating the operation from k=1 (one) till k=N;

integrating the products by N-symbol-time with respect to each of the first to mth pieces of fixed data;

obtaining an integration value for N-symbol-time with respect to each of the first to mth pieces of fixed data for each of the plurality of delayed signals;

obtaining a maximum value of the integration values for N-symbol-time of the respective first to mth pieces of fixed data as the maximum correlation value for each of the plurality of delayed signals; and obtaining a maximum value of the maximum correlation values for the plurality of delayed signals, and deciding the delay time, in which the maximum correlation value is the greatest, to acquire synchronism.

BRIEF DESCRIPTION OF THE DRAWINGS

FIGS. 1(A) and 1(B) are block diagrams showing a synchronous acquisition device for a CDMA receiver according to the first embodiment of the present invention;

FIG. 3 is a block diagram showing a path-corresponding maximum value detector 31 in a maximum correlation value generation unit $115_j$ shown in FIG. 1(B);

FIGS. 4(A) and 4(B) are block diagrams showing a synchronous acquisition device for a CDMA receiver according to the second embodiment of the present invention;

FIGS. 5(A) and 5(B) are block diagrams showing a synchronous acquisition device for a CDMA receiver according to the third embodiment of the present invention;

FIGS. 7(A) and 7(B) are block diagrams showing a synchronous acquisition device for a CDMA receiver according to the fourth embodiment of the present invention;

FIGS. 9(A) and 9(B) are block diagrams showing a conventional synchronous acquisition device for a CDMA receiver.

BEST MODE FOR CARRYING OUT THE INVENTION

Figure 2:
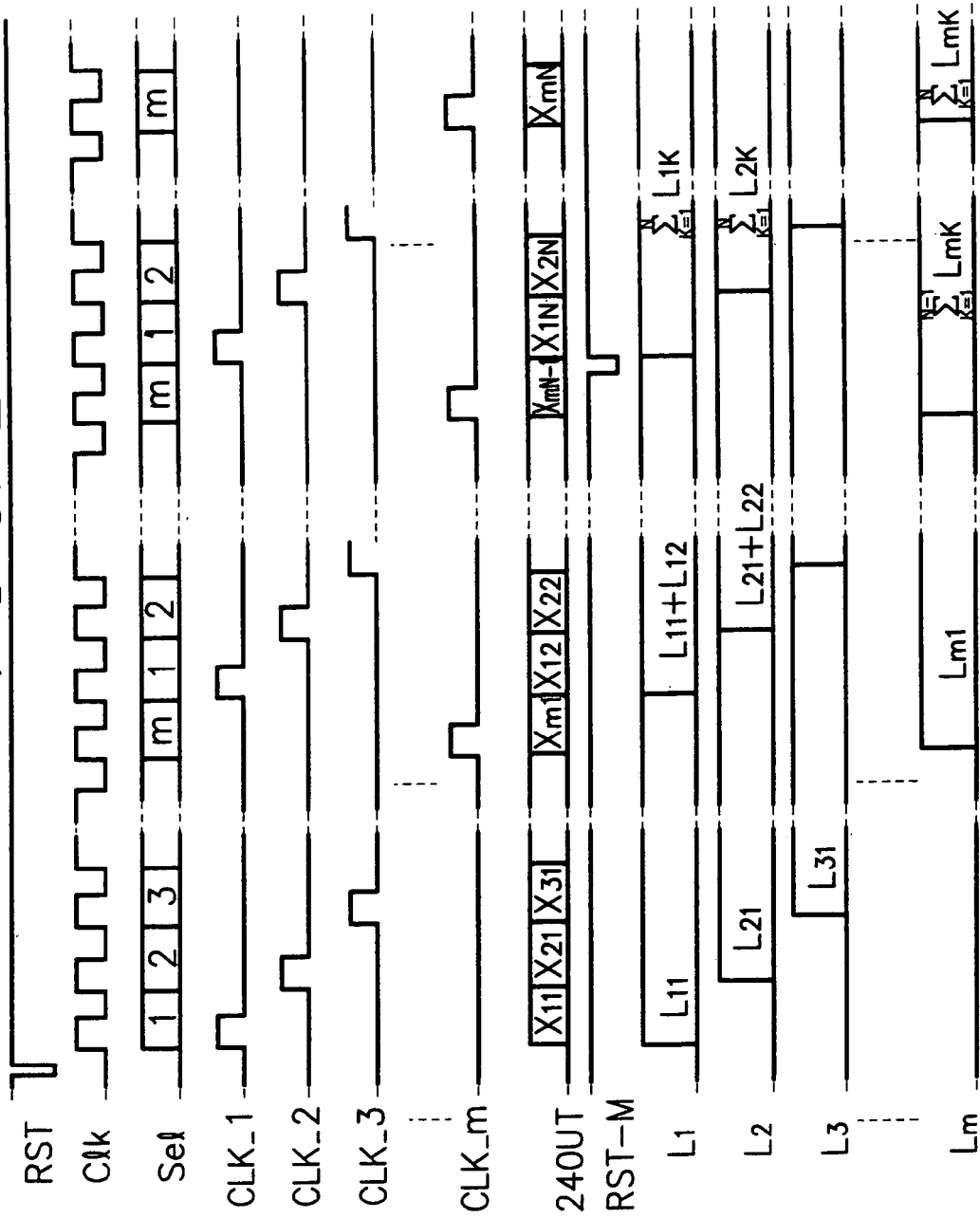
FIG. 2 is a timing chart illustrating the operation of the synchronous acquisition device shown in FIGS. 1(A) and 1(B)

The best mode for carrying out the present invention will be described below with reference to the drawings.

FIG. 1(A) is a block diagram showing a synchronous acquisition device for a CDMA receiver according to the first embodiment of the present invention. The synchronous acquisition device includes the same parts with the same reference numerals as those of the synchronous acquisition device in FIG. 9(A).

As shown in FIG. 1(A), the synchronous acquisition device is provided with first to nth maximum correlation value generation units $115_1$, $115_2$, $115_3$, ..., $115_n$ instead of the maximum correlation value generation units $15_1$, $15_2$, $15_3$, ..., $15_n$ of FIG. 9(A). Into the first to nth maximum correlation value generation units $115_1$, $115_2$, $115_3$, ..., $115_n$, signals $r_1(t)$, $r_2(t)$, $r_3(t)$, ..., $r_n(t)$ delayed by delay units $10_1$, $10_2$, $10_3$, ..., $10_n$ are inputted, respectively.

In the synchronous acquisition device of the first embodiment, similarly to the synchronous acquisition device of FIG. 9(A), a receiver signal r(t) is branched into first to nth paths as first to nth branch signals, and the jth branch signal branching into the jth path (1 (one)≦j≦n) of the first to nth paths is delayed by the jth delay unit $10_j$ to be the jth delayed signal $r_j(t)$. The jth delayed signal $r_j(t)$ is inputted to the jth maximum correlation value generation unit $115_j$.

The first to nth maximum correlation value generation units $115_1$, $115_2$, $115_3$, ..., $115_n$ are of like construction, and thus but one of them, the jth maximum correlation value generation units $115_j$, is illustrated in detail in FIG. 1(B).

Referring to FIG. 1(B), the jth maximum correlation value generation units $115_j$ multiplies the jth delayed signal $r_j(t)$ by only a spreading code c(t) at a multiplier 21, and integrates the output of the multiplier 21 by one-symbol-time at an integrator 12. The integrator 12 also includes an adder 16 and a delay element 17. After that, when multiplying an output signal from the integrator 12 by fixed data $x_i(t)$ (1 (one)≦i≦m) at a multiplier 23, the jth maximum correlation value generation units $115_j$ sequentially sends first to mth pieces of fixed data $x_1(t)$, $x_2(t)$, $x_3(t)$, ..., $x_m(t)$ to the multiplier 23 from a fixed data selector 24. Herewith the adder 16 in the integrator 12 can be shared among the first to mth pieces of fixed data $x_1(t)$, $x_2(t)$, $x_3(t)$, ..., $x_m(t)$, and thus the circuit size can be reduced.

More properly, the jth maximum correlation value generation units $115_j$ includes the multiplier 21 for multiplying the jth delayed signal $r_j(t)$ by the spreading code c(t), and the integrator 12 for integrating an output signal from the multiplier 21 by one-symbol-time. The jth maximum correlation value generation unit $115_j$ further includes first to mth fixed data generator $25_1$, $25_2$, $25_3$, ..., $25_m$ for generating the first to mth pieces of fixed data $x_1(t)$, $x_2(t)$, $x_3(t)$, ..., $x_m(t)$, the selector 24 for sequentially selecting and outputting one of the first to mth pieces of fixed data $x_1(t)$, $x_2(t)$, $x_3(t)$, ..., $x_m(t)$ in response to a selection signal Sel, and the multiplier 23 for multiplying an output signal from the integrator 12 by an output signal from the selector 24. The selection signal Sel is produced by a selection signal generator 26, and sequentially indicates 1 (one) to m as i. The selector 24 selects and outputs, for example, the first fixed data $x_1(t)$ when the selection signal Sel indicates 1 (one).

As is described above, the first to mth fixed data generators $25_1$, $25_2$, $25_3$, ..., $25_m$ and the selector 24 possess the first to mth pieces of fixed data $x_1(t)$, $x_2(t)$, $x_3(t)$, ..., $x_m(t)$, and function as fixed data sequential output units for sequentially outputting the first to mth pieces of fixed data $x_1(t)$, $x_2(t)$, $x_3(t)$, ..., $x_m(t)$.

Since $x_i(t)$ in above expression (3) varies with each symbol, it can be expressed as:

$$x_i(t)=x_{ik}(kT \leq t \leq (k+1)T)$$

in which T indicates the length of one-symbol-time, and k is one of integers from 1 (one) to N (N: the number of symbols of the fixed data). Accordingly, expression (3) can be transformed as follows:

$$y_{ij}(t) = \sum_{k=1}^{N} x_{ik} \int_0^T r(t-\tau_j+kT)c(t+kT)dt. \qquad (4)$$

As can be seen from expression (4), the same result as in FIG. 9(B) is given in FIG. 1, where the multiplier 21 first multiplies the delayed signal $r_j(t)$ by the spreading code c(t), and after the integrator 12 integrates the output signal from the multiplier 21 by one-symbol-time, the output signal from the integrator 12 is integrated by $x_{ik}$.

In FIG. 1(B), the first to mth pieces of fixed data $x_1(t)$, $x_2(t)$, $x_3(t)$, ..., $x_m(t)$ are sequentially outputted by the fixed data selector 24 and multiplied by the output signal from the integrator 12 at the multiplier 23. After that, first to mth multiplication results are distributed to first to mth latches $27_1(L_1)$, $27_2(L_2)$, $27_3(L_3)$, ..., $27_m(L_m)$ each corresponding to the first to mth pieces of fixed data $x_1(t)$, $x_2(t)$, $x_3(t)$, ..., $x_m(t)$ by selectors 28 and 29 in response to the selection signal Sel. Thus a synchronous acquisition device with small-sized circuits can be achieved.

Incidentally, an adder 30 adds output signals from the multiplier 23 and the selector 28, and supplies the sum to the first to mth latches $27_1(L_1)$, $27_2(L_2)$, $27_3(L_3)$, ..., $27_m(L_m)$. The selector 29 sends a clock signal clk to each of the first to mth latches $27_1(L_1)$, $27_2(L_2)$, $27_3(L_3)$, ..., $27_m(L_m)$ in order in response to the selection signal Sel. A path-corresponding maximum value detector 31 outputs a maximum value $y_{ij}(t)$ max and i corresponding to the maximum value $y_{ij}(t)$ max in response to the output signal of the selector 28 and the selection signal Sel from the selection signal generator 26.

In the following, a detailed description will be given of the synchronous acquisition device with reference to FIGS. 1(A) and 1(B).

The synchronous acquisition device of the first embodiment is employed for a CDMA receiver, which receives as a receiver signal r(t) a spectrum-spread signal generated by spectrum-spreading transmission data including one of first to mth pieces of fixed data $x_1(t)$, ..., $x_m(t)$ (see FIG. 1(B)) using a spreading code as shown in FIG. 1(A). Each of the first to mth pieces of fixed data $x_1(t)$, ..., $x_m(t)$ includes first to Nth symbols (N: an integer 2 or more). The synchronous acquisition device comprises first to nth paths (n: an integer 2 or more), into which first to nth branch signals obtained by branching the receiver signal r(t) are supplied.

The synchronous acquisition device further comprises first to nth delay units $10_1$, ..., $10_n$ for outputting first to nth delayed signals by giving different amounts of first to nth delays to the respective first to nth branch signals, first to nth maximum correlation value generation units $115_1$, ..., $115_n$ for generating first to nth maximum correlation values based on the first to nth delayed signals, and a synchronism-acquiring maximum value detector 14 for detecting a maximum value of the first to nth maximum correlation values to acquire synchronism.

As shown in FIG. 1(B), the jth maximum correlation value generation unit $115_j$ (1 (one)≦j≦n) of the first to nth maximum correlation value generation units $115_1$, ..., $115_n$, includes a first multiplier 21, a first integrator 12, fixed data sequential output units ($25_1$, ..., $25_m$, 24), a second multiplier 23, correlation value sequential output units (30, $27_1$, ..., $27_m$, 28), and a path-corresponding maximum value detector 31.

The first multiplier 21 of the jth maximum correlation value generation unit $115_j$ multiplies the jth delayed signal $r_j(t)$ of the first to nth delayed signals $r_1(t)$, ..., $r_n(t)$ by the spreading code c(t).

The first integrator 12 of the jth maximum correlation value generation unit $115_j$ integrates an output signal from the first multiplier 21 by one-symbol-time.

The fixed data sequential output units ($25_1$, ..., $25_m$, 24) of the jth maximum correlation value generation unit $115_j$ have the first to mth pieces of fixed data $x_1(t)$, ..., $x_m(t)$, respectively, and sequentially outputs the kth symbol of the first to mth pieces of fixed data $x_1(t)$, ..., $x_m(t)$ repeatedly from k=1 (one) to k=N.

The second multiplier 23 of the jth maximum correlation value generation unit $115_j$ multiplies an output signal from the first integrator 12 by the kth symbol of the respective first to mth pieces of fixed data $x_1(t)$, ..., $x_m(t)$ sequentially outputted from the fixed data sequential output units ($25_1$, ..., $25_m$, 24), and sequentially outputs first to mth multiplication results. The operation is repeated from k=1 (one) to k=N.

The correlation value sequential output units (30, $27_1$, ..., $27_m$, 28) of the jth maximum correlation value generation unit $115_j$ sequentially outputs the first to mth multiplication results of the second multiplier 23 as first to mth correlation values. Thus, the correlation value sequential output units (30, $27_1$, ..., $27_m$, 28) function as a second integrator that integrates the respective first to mth multiplication results from the second multiplier 23 by N-symbol-time as first to mth integration values, and sequentially outputs the first to mth integration values as the first to mth correlation values.

The path-corresponding maximum value detector 31 of the jth maximum correlation value generation unit $115_j$ outputs a maximum value of the first to mth correlation values sequentially outputted by the second integrator (30, $27_1$, ..., $27_m$, 28) as the jth maximum correlation value of the first to nth maximum correlation values.

The fixed data sequential output units ($25_1$, ..., $25_m$, 24) of the jth maximum correlation value generation unit $115_j$ includes first to mth fixed data generators $25_1$, ..., $25_m$ for generating the first to mth pieces of fixed data $x_1(t)$, ..., $x_m(t)$, and a fixed data selector 24 for sequentially selecting and outputting the kth symbol of the respective first to mth pieces of fixed data $x_1(t)$, ..., $x_m(t)$ generated by the first to mth fixed data generators $25_1$, ..., $25_m$, repeatedly from k=1 (one) until k=N.

The jth maximum correlation value generation unit $115_j$ further includes a selection signal generator 26 for repeatedly generating a selection signal that sequentially indicates 1 (one) to m.

Having received the selection signal Sel, the fixed data selector 24 selects and outputs the kth symbol of one of the first to mth pieces of fixed data $x_1(t)$, ..., $x_m(t)$ corresponding to the selection signal Sel that indicates 1 to m in sequence. The operation is sequentially repeated from k=1 (one) until k=N.

The second integrator (30, $27_1$, ..., $27_m$, 28) of the jth maximum correlation value generation unit $115_j$ includes first to mth latches $27_1$, ..., $27_m$ corresponding to the first to mth pieces of fixed data $x_1(t)$, ..., $x_m(t)$, a latch output selector 28 for sequentially selecting and outputting an output signal from one of the first to mth latches $27_1$, ..., $27_m$ correspondingly to the selection signal Sel sequentially indicating 1 (one) to m, and an adder 30 for sequentially adding output signals from the first to mth latches $27_1$, ..., $27_m$ to the first to mth multiplication results of the second multiplier 23, respectively, and outputting first to mth additional results. The first to mth latches $27_1$, ..., $27_m$ sequentially latch the first to mth additional results correspondingly to the selection signal Sel indicating 1 (one) to m in sequence in cooperation with the selector 29 that receives the selection signal Sel.

The latch output selector 28 sequentially selects and outputs as first to mth correlation values output signals from the first to mth latches $27_1$, ..., $27_m$ after the first to mth latches $27_1$, ..., $27_m$ latch the first to mth additional results as the first to mth integration values.

As is described above, the plural pieces of fixed data are distributed by the fixed data selector 24, and thus a small-circuit-scale synchronous acquisition device can be achieved.

There will be given an explanation detailing the reason why a small-circuit-scale synchronous acquisition device can be obtained.

1. The fixed data selector 24 switches the first to mth pieces of fixed data $x_1(t)$, $x_2(t)$, $x_3(t)$, ..., $x_m(t)$, and thereby one multiplier 23 shown in FIG. 1 can represent the m multipliers for multiplying the first to mth pieces of fixed data $x_1(t)$, $x_2(t)$, $x_3(t)$, ..., $x_m(t)$ by c(t) in the precedent step for the adders 16 in FIG. 9(B).

2. The integrators 12' in FIG. 9(B) conducts not only one-symbol-time integration but also k-symbol-time integration (integration of symbol rate), and therefore corresponds to the second integrator composed of the adder 30, the first to mth latches $27_1(L_1)$, $27_2(L_2)$, $27_3(L_3)$, ..., $27_m(L_m)$ and the selector 28 rather than the integrator 12 in FIG. 1. The integrator 12 in FIG. 1 is a newly provided integrator for adopting the method, in which the first to mth pieces of fixed data $x_1(t)$, $x_2(t)$, $x_3(t)$, ..., $x_m(t)$ are switched by the fixed data selector 24 and sequentially multiplied by the multiplier 23, in need of maintaining one-symbol-time of an input signal during the sequential multiplication. Namely, the integrator 12 in FIG. 1(B) is newly added to the configuration and different from the integrators 12' in FIG. 9(B). Consequently, the adder 30 in FIG. 1(B) is considered to represent the adders 16 in FIG. 9(B).

3. The m pieces of multipliers in FIG. 9(B), which are directly connected and immediately preceding to the adders 16, are represented by the multiplier 21 in FIG. 1(B), and thereby the number of multipliers is reduced. In other words, the multiplication process in FIG. 9(B) is changed. In FIG. 9(B), $x_i(t)$ is multiplied by c(t) first and then multiplied by $r_n(t)$, while in FIG. 1(B), $r_j(t)$ is first multiplied by c(t) and integrated by one-symbol-time, and after that, multiplied by $x_i(t)$.

In short, the multipliers 21 and 23 in FIG. 1(B) represent m sets of a couple of multipliers in the precedent step for the adders 16 in FIG. 9(B). Moreover, only one adder 30 in FIG. 1(B) represents the m pieces of adders 16, and besides the integrator 12 for one-symbol-time integration, selectors 24, 28 and 29, and the selection signal generator 26 shown in FIG. 1(B) are added to the configuration instead.

In the following, the operation of the jth maximum correlation value generation unit $115_j$ will be explained with reference to FIG. 2.

The selection signal generator 26 generates a selection signal that sequentially indicates 1 (one) to m as i (see the third line in FIG. 2). The sequential indication of 1 (one) to m by the selection signal synchronizes with a clock signal clk inputted to the selector 29 (see the second line in FIG. 2).

The selector 29 refers to the selection signal Sel generated by the selection signal generator 26, and sends the clock signal clk to the latch $27_i$ ($27_1, 27_2, \ldots, 27_m$) corresponding to the Sel value i.

That is, the selector 29 generates clock signals CLK_1 to CLK_m illustrated by the fourth to seventh lines in FIG. 2, and sends the clock signals CLK_1 to CLK_m to the first to mth latches $27_1(L_1)$, $27_2(L_2)$, $27_3(L_3)$, ..., $27_m(L_m)$, respectively.

The fixed data selector 24 switches the first to mth pieces of fixed data $x_1(t), x_2(t), x_3(t), \ldots, x_m(t)$ correspondingly to the selection signal Sel indicating 1 (one) through m to sequentially output them to the multiplier 23.

In FIG. 2, 24OUT denotes an output signal from the selector 24 in FIG. 1. The first to mth fixed data generators $25_1, 25_2, 25_3, \ldots, 25_m$ in FIG. 1 possess the mutually independent first to mth pieces of fixed data $x_1(t), x_2(t), x_3(t), \ldots, x_m(t)$ for plural-symbol-time in a time serial. The selector 24 sequentially selects and outputs one of the first to mth pieces of fixed data $x_1(t), x_2(t), x_3(t), \ldots, x_m(t)$ as the ith fixed data $x_i(t)$ by the following step.

The selection signal generator 26 generates a selection signal Sel that sequentially indicates 1 (one) to m as i in synchronization with the symbol rate of a receiver signal r(t) (see FIG. 1(A)). The selector 24 first selects $x_1(t)$ according to i (i=1) sent from the selection signal generator 26, and outputs the first symbol $X_{11}$ of $x_1(t)$. Subsequently, the selector 24 outputs the following first symbols in order as outputting $X_{21}$ of $x_2(t)$ when i=2, $X_{31}$ of $x_3(t)$ when i=3, and so on, until outputting the first symbol $X_{m1}$ of $x_m(t)$ at i=m and thereby having gone once through the first symbol group. Next, the operation proceeds to outputting the next symbol group. First, the selector 24 selects $x_1(t)$ according to i=1, and outputs the second symbol $X_{12}$ of $x_1(t)$. Then, the selector 24 outputs the following second symbols $X_{22}$ of $x_2(t)$, $X_{32}$ of $x_3(t)$, ..., $X_{m2}$ of $x_m(t)$ in order according to i=2, i=3, ..., i=m, respectively. In this manner, the selector 24 repeats the operation for all the symbols of each $x_i(t)$ until outputting $X_{mN}$ to supply $x_i(t)$ used for a series of correlation value integration.

In FIG. 2, $L_1$ denotes an output signal from the latch $27_1$ ($L_1$) in FIG. 1. The output of the selector 24 is multiplied by a one-symbol-time integrated input signal at the multiplier 23, added to the output of the latch $27_1$ ($L_1$) selected by the selector 28 at the adder 30, and latched by the clock signal CLK_1 at the latch $27_1$ ($L_1$). The input signal $a_j(t)$ for one-symbol-time used for the multiplication at the multiplier 23 is expressed based on expression (4) as follows:

$$a_j(t) = \int_0^T r(t-\tau_j+kT)c(t+kT)dt \quad (5).$$

Incidentally, a reset signal RST illustrated by the first line in FIG. 2 has initializes the data held by the latches $27_1(L_1)$, $27_2(L_2)$, $27_3(L_3)$, ..., $27_m(L_m)$ to 0, and thus data $L_{11}$ latched first and held by the latch $27_1$ ($L_1$) afterwards are expressed as follows:

$$L_{11} = X_{11} a_j(t) \quad (6).$$

After $L_{11}$ is held by the latch $27_1$ ($L_1$) according to the above expression, $L_{11}$ selected by the selector 28 is inputted to the adder 30 to be added to a new input signal, and thus forms $L_{11}+L_{12}$.

Herewith the value $L_{11}+L_{12}+ \ldots +L_{1N}$ is held by the latch $27_1$ ($L_1$) as a correlation value $y_{1j}(t)$ in the last result and outputted.

Similarly, the value $L_{m1}+L_{m2}+ \ldots +L_{mN}$ is held by the latch $27_m$ ($L_m$) as a correlation value $y_{mj}(t)$ in the last result and outputted.

The selector 28 sequentially selects and outputs one of the output signals $y_{1j}(t)$ to $y_{mj}(t)$ from the latches $27_1$ ($L_1$) to $27_m$ ($L_m$) corresponding to the selection signal Sel indicating 1 (one) to m in sequence as i to supply it to the path-corresponding maximum value detector 31.

The path-corresponding maximum value detector 31 outputs a maximum value $y_{ij}(t)$ max and i corresponding to the maximum value $y_{ij}(t)$ max in response to an output signal $y_{ij}(t)$ from the selector 28 and the selection signal Sel form the selection signal generator 26.

With reference to FIG. 3, the path-corresponding maximum value detector 31 includes a first latch 311 for holding a signal $y_{ij}(t)$ in response to a clock signal, and a second latch 312 for holding a value of 1 (one) to m indicated by the selection signal Sel as i in response to the clock signal. There is further provided a comparator (comp) 313 that receives the signal $y_{ij}(t)$ as the first input a and the output of the first latch 311 as the second input b, and outputs a signal a>b indicating that the first input a is larger than the second input b when the first input a is larger than the second input b. In addition, an AND circuit (AND) 314 sends a clock signal clk to the first latch 311 and the second latch 312 only when receiving the signal a>b from the comparator 313.

The data previously latched by the first latch 311 and the second latch 312 are initialized to 0 by a reset signal RST-M illustrated by the ninth line in FIG. 2.

Accordingly, a maximum value $y_{ij}(t)$ max of signals $y_{ij}(t)$ is held by the first latch 311 as a retention output. Besides, the second latch 312 holds the value of i corresponding to the maximum value $y_{ij}(t)$ max as a retention output.

FIG. 4(A) is a block diagram showing a synchronous acquisition device for a CDMA receiver according to the second embodiment of the present invention. The synchronous acquisition device includes the same parts with the same reference numerals as those of the synchronous acquisition devices in FIGS. 1(A) and 9(A).

As shown in FIG. 4(A), the synchronous acquisition device is provided with first to nth maximum correlation value generation units $215_1, 215_2, 215_3, \ldots, 215_n$ instead of the maximum correlation value generation units $115_1, 115_2, 115_3, \ldots, 115_n$ of FIG. 1(A). The first to nth maximum correlation value generation units $215_1, 215_2, 215_3, \ldots, 215_n$ are of like construction, and thus but one of them, the jth maximum correlation value generation units $215_j$, is illustrated in detail in FIG. 4(B).

The synchronous acquisition device for a CDMA receiver according to the second embodiment of the present invention will be explained in detail with reference to FIGS. 4(A) and 4(B).

As can be seen in FIG. 4(A), the synchronous acquisition device is employed for a CDMA receiver that receives as a receiver signal r(t) a signal transmitted by spectrum-spreading transmission data including one of first to mth pieces of fixed data $x_1(t) \ldots, x_m(t)$ using a spreading code $c(t)$. Each of the first to mth pieces of fixed data $x_1(t) \ldots, x_m(t)$ includes first to Nth symbols (N: an integer 2 or more). The synchronous acquisition device is provided with first to nth paths (n: an integer 2 or more), which are supplied with first to nth branch signals obtained by branching the receiver signal $r(t)$.

The synchronous acquisition device further comprises first to nth delay units $10_1, \ldots, 10_m$ for outputting first to nth delayed signals by giving different amounts of first to nth delays to the respective first to nth branch signals, first to nth maximum correlation value generation units $215_1, 215_n$ for generating first to nth maximum correlation values based on the first to nth delayed signals, a synchronism-acquiring maximum value detector 14 for detecting a maximum value of the first to nth maximum correlation values to acquire synchronism, and fixed data sequential output units ($25_1, \ldots, 25_m$, 24). The fixed data sequential output units ($25_1, \ldots, 25_m$, 24) have the first to mth pieces of fixed data $x_1(t), \ldots, x_m(t)$, respectively, and sequentially outputs the kth symbol of the first to mth pieces of fixed data $x_1(t), \ldots, x_m(t)$. The operation is repeated from k=1 (one) to k=N.

As shown in FIG. 4(B), the jth maximum correlation value generation unit $215_j$ (1 (one)$\leq$j$\leq$n) of the first to nth maximum correlation value generation units $215_1, \ldots, 215_n$ includes a first multiplier 21, a first integrator 12, a second multiplier 23, correlation value sequential output units (30, $27_1, \ldots, 27_m$, 28), and a path-corresponding maximum value detector 31.

The first multiplier 21 of the jth maximum correlation value generation unit $215_j$ multiplies the jth delayed signal $r_j(t)$ of the first to nth delayed signals $r_1(t), \ldots, r_n(t)$ by the spreading code $c(t)$.

The first integrator 12 of the jth maximum correlation value generation unit $215_j$ integrates an output signal from the first multiplier 21 by one-symbol-time.

The second multiplier 23 of the jth maximum correlation value generation unit $215_j$ multiplies an output signal from the first integrator 12 by the kth symbol of the respective first to mth pieces of fixed data $x_1(t), \ldots, x_m(t)$ sequentially outputted from the fixed data sequential output units ($25_1, \ldots, 25_m$, 24) of FIG. 4(A), and sequentially outputs first to mth multiplication results. The operation is repeated from k=1 (one) to k=N.

The correlation value sequential output units (30, $27_1, \ldots, 27_m$, 28) of the jth maximum correlation value generation unit $215_j$ sequentially outputs the first to mth multiplication results of the second multiplier 23 as first to mth correlation values. Thus, the correlation value sequential output units (30, $27_1, \ldots, 27_m$, 28) function as a second integrator that integrates the respective first to mth multiplication results from the second multiplier 23 by N-symbol-time as first to mth integration values, and sequentially outputs the first to mth integration values as the first to mth correlation values.

The path-corresponding maximum value detector 31 of the jth maximum correlation value generation unit $215_j$ outputs a maximum value of the first to mth correlation values sequentially outputted by the second integrator (30, $27_1, \ldots, 27_m$, 28) as the jth maximum correlation value of the first to nth maximum correlation values.

In the synchronous acquisition device of FIG. 4(A), the fixed data sequential output units ($25_1, \ldots, 25_m$, 24) includes first to mth fixed data generators $25_1, \ldots, 25_m$ for generating the first to mth pieces of fixed data $x_1(t), \ldots, x_m(t)$, and a fixed data selector 24 for sequentially selecting and outputting the kth symbol of the respective first to mth pieces of fixed data $x_1(t), \ldots, x_m(t)$ generated by the first to mth fixed data generators $25_1, \ldots, 25_m$, repeatedly from k=1 (one) until k=N.

The synchronous acquisition device of FIG. 4(A) further comprises a selection signal generator 26 for repeatedly generating a selection signal Sel that sequentially indicates 1 (one) to m, and a selector 29 for receiving the selection signal Sel.

Having received the selection signal Sel, the fixed data selector 24 selects and outputs the kth symbol of one of the first to mth pieces of fixed data $x_1(t), \ldots, x_m(t)$ corresponding to the selection signal Sel that indicates 1 (one) to m in sequence. The operation is sequentially repeated from k=1 (one) until k=N.

In FIG. 4(B), the second integrator (30, $27_1, \ldots, 27_m$, 28) of the jth maximum correlation value generation unit $215_j$ includes first to mth latches $27_1, \ldots, 27_m$ corresponding to the first to mth pieces of fixed data $x_1(t), \ldots, x_m(t)$, a latch output selector 28 for sequentially selecting and outputting an output signal from one of the first to mth latches $27_1, \ldots, 27_m$ correspondingly to the selection signal Sel sequentially indicating 1 (one) to m, and an adder 30 for sequentially adding output signals from the first to mth latches $27_1, \ldots, 27_m$ to the first to mth multiplication results of the second multiplier 23, respectively, and outputting first to mth additional results. The first to mth latches $27_1, \ldots, 27_m$ sequentially latch the first to mth additional results correspondingly to the selection signal Sel indicating 1 (one) to m in sequence in cooperation with the selector 29 of FIG. 4(A) that receives the selection signal Sel.

The latch output selector 28 sequentially selects and outputs as first to mth correlation values output signals from the first to mth latches $27_1, \ldots, 27_m$ after the first to mth latches $27_1, \ldots, 27_m$ latch the first to mth additional results as the first to mth integration values.

FIG. 5(A) is a block diagram showing a synchronous acquisition device for a CDMA receiver according to the third embodiment of the present invention. The synchronous acquisition device includes the same parts with the same reference numerals as those of the synchronous acquisition devices in FIGS. 1(A), 4(A) and 9(A).

As shown in FIG. 5(A), the synchronous acquisition device is provided with first to nth maximum correlation value generation units $315_1, 315_2, 315_3, \ldots, 315_n$ instead of the maximum correlation value generation units $115_1, 115_2, 115_3, \ldots, 115_n$ of FIG. 1(A). The first to nth maximum correlation value generation units $315_1, 315_2, 315_3, \ldots, 315_n$ are of like construction, and thus but one of them, the jth maximum correlation value generation units $315_j$, is illustrated in detail in FIG. 5(B).

The synchronous acquisition device for a CDMA receiver according to the third embodiment of the present invention will be explained in detail with reference to FIGS. 5(A) and 5(B).

As can be seen in FIG. 5(A), the synchronous acquisition device is employed for a CDMA receiver that receives as a receiver signal $r(t)$ a signal transmitted by spectrum-spreading transmission data including one of first to mth pieces of fixed data $x_1(t) \ldots, x_m(t)$ using a spreading code $c(t)$. Each of the first to mth pieces of fixed data $x_1(t) \ldots, x_m(t)$ includes first to Nth symbols (N: an integer 2 or more). The synchronous acquisition device is provided with first to nth paths (n: an integer 2 or more), which are supplied with first to nth branch signals obtained by branching the receiver signal $r(t)$.

The synchronous acquisition device further comprises first to nth delay units $10_1, \ldots, 10_m$ for outputting first to nth delayed signals by giving different amounts of first to nth delays to the respective first to nth branch signals, first to nth maximum correlation value generation units $315_1, \ldots, 315_n$ for generating first to nth maximum correlation values based on the first to nth delayed signals, and a synchronism-acquiring maximum value detector 14 for detecting a maximum value of the first to nth maximum correlation values to acquire synchronism.

As shown in FIG. 5(B), the jth maximum correlation value generation unit $315_j$ (1 (one)$\leq j \leq$n) of the first to nth maximum correlation value generation units $315_1, \ldots, 315_n$ includes a first multiplier 21, a first integrator 12, a fixed data sequential output units ($25_1, \ldots, 25_m$, 24), a second multiplier 23, correlation value sequential output units (30, $41_1, \ldots, 41_m$), and a path-corresponding maximum value detector 31.

The first multiplier 21 of the jth maximum correlation value generation unit $315_j$ multiplies the jth delayed signal $r_j(t)$ of the first to nth delayed signals $r_1(t), \ldots, r_n(t)$ by the spreading code c(t).

The first integrator 12 of the jth maximum correlation value generation unit $315_j$ integrates an output signal from the first multiplier 21 by one-symbol-time.

The fixed data sequential output units ($25_1, \ldots, 25_m$, 24) of the jth maximum correlation value generation unit $315_j$ have the first to mth pieces of fixed data $x_1(t), \ldots, x_m(t)$, respectively, and sequentially outputs the kth symbol of the first to mth pieces of fixed data $x_1(t), \ldots, x_m(t)$. The operation is repeated from k=1 (one) to k=N.

The second multiplier 23 of the jth maximum correlation value generation unit $315_j$ multiplies an output signal from the first integrator 12 by the kth symbol of the respective first to mth pieces of fixed data $x_1(t), \ldots, x_m(t)$ sequentially outputted from the fixed data sequential output units ($25_1, \ldots, 25_m$, 24), and sequentially outputs first to mth multiplication results. The operation is repeated from k=1 (one) to k=N.

The correlation value sequential output units (30, $41_1, \ldots, 41_m$) of the jth maximum correlation value generation unit $315_j$ sequentially outputs the first to mth multiplication results of the second multiplier 23 as first to mth correlation values. Thus, the correlation value sequential output units (30, $41_1, \ldots, 41_m$) function as a second integrator that integrates the respective first to mth multiplication results from the second multiplier 23 by N-symbol-time as first to mth integration values, and sequentially outputs the first to mth integration values as the first to mth correlation values.

The path-corresponding maximum value detector 31 of the jth maximum correlation value generation unit $315_j$ outputs a maximum value of the first to mth correlation values sequentially outputted by the second integrator (30, $41_1, \ldots, 41_m$) as the jth maximum correlation value of the first to nth maximum correlation values.

The fixed data sequential output units ($25_1, \ldots, 25_m$, 24) of the jth maximum correlation value generation unit $315_j$ includes first to mth fixed data generators $25_1, \ldots, 25_m$ for generating the first to mth pieces of fixed data $x_1(t), \ldots, x_m(t)$, and a fixed data selector 24 for sequentially selecting and outputting the kth symbol of the respective first to mth pieces of fixed data $x_1(t), \ldots, x_m(t)$ generated by the first to mth fixed data generators $25_1, \ldots, 25_m$, repeatedly from k=1 (one) until k=N.

The jth maximum correlation value generation unit $315_j$ further includes a counter 42 that functions as a selection signal generator for repeatedly generating a selection signal Sel indicating 1 (one) to m in sequence. The counter 42, which is supplied with a clock signal clk having a positive integral multiple frequency of the chip rate of the spreading code c(t), counts the clock signal clk from 1 (one) to m in sequence, and thereby outputs a counter value indicating 1 (one) to m in sequence as the selection signal Sel.

Having received the selection signal Sel from the counter 42, the fixed data selector 24 selects and outputs the kth symbol of one of the first to mth pieces of fixed data $x_1(t), \ldots, x_m(t)$ corresponding to the selection signal Sel that indicates 1 (one) to m in sequence. The operation is sequentially repeated from k=1 (one) until k=N.

The second integrator (30, $41_1, \ldots, 41_m$) of the jth maximum correlation value generation unit $315_j$ includes first to mth latches $41_1, \ldots, 41_m$ that are vertically connected to each other, and an adder 30 for sequentially adding an output signal from the mth latch $41_m$ to each of the first to mth multiplication results of the second multiplier 23, and outputting first to mth additional results as input signals to the first latch $41_1$. The ith latch (1 (one)$\leq i \leq$m) of the first to mth latches $41_1, \ldots, 41_m$ retains an input signal in response to the clock signal clk, and outputs the retained signal. The first latch $41_1$ sequentially retains and outputs the first to mth integration values as the first to mth correlation values in response to the clock signal clk while the adder 30 sequentially sends the first to mth additional results as the first to mth integration values to the first latch $41_1$.

Figure 6:
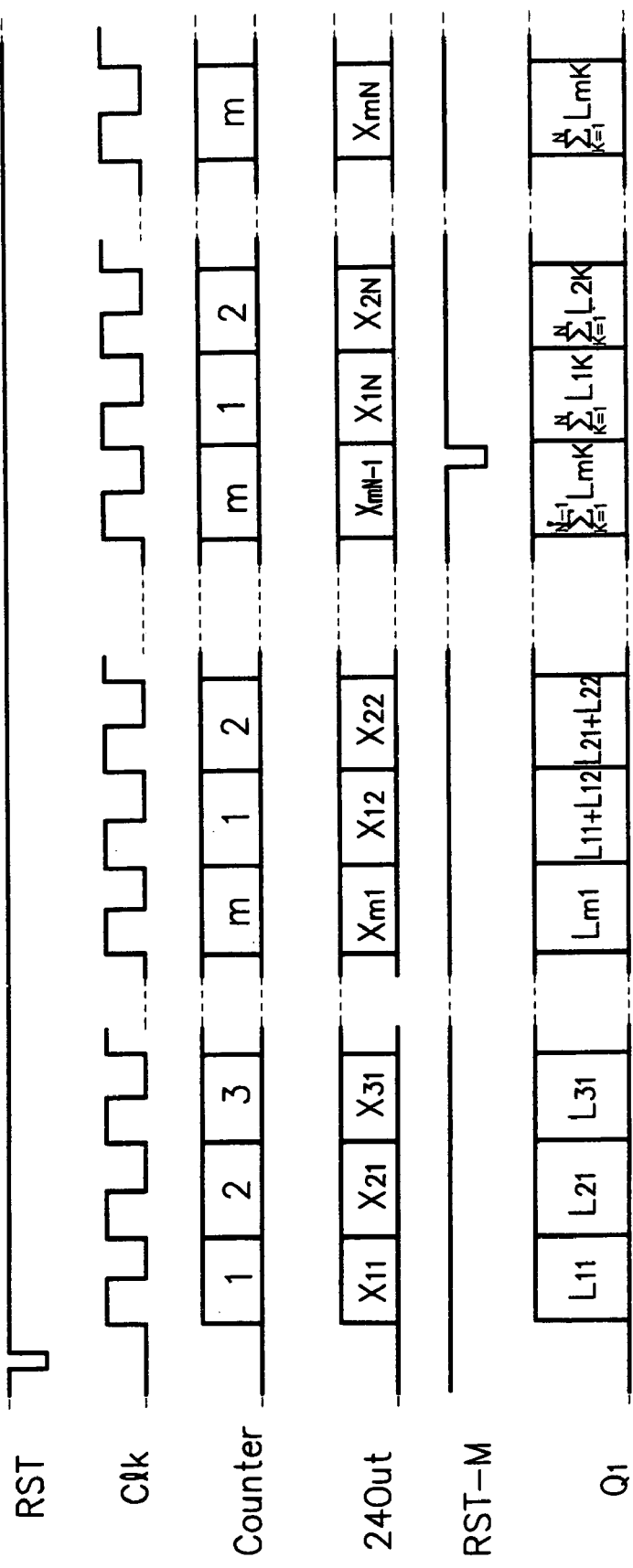
FIG. 6 is a timing chart illustrating the operation of the synchronous acquisition device shown in FIGS. 5(A) and 5(B)

Namely, in the jth maximum correlation value generation unit $315_j$ of FIG. 5(B), there are provided latches $41_1(Q_1), 41_2(Q_2), 41_3(Q_3), \ldots, 41_m(Q_m)$ as many as m pieces of fixed data $x_1(t), x_2(t), x_3(t), \ldots, x_m(t)$, and the latches $41_1(Q_1), 41_2(Q_2), 41_3(Q_3), \ldots, 41_m(Q_m)$ are controlled by the clock signal clk (see the second line Clk in FIG. 6). The selection signal Sel is controlled by the counter value of the counter 42 counting the clock signal clk (see the third line Counter in FIG. 6), and synchronized with the clock signal clk to distribute the fixed data $x_i(t)$. In this way, the circuitry is more simplified.

The counter value of the counter 42 (counter: i=1 to m in FIG. 6) is held by a latch 43 and inputted to the path-corresponding maximum value detector 31.

In FIG. 6, 24OUT also denotes an output signal from the selector 24 in FIG. 5. The output signal from the selector 24 of FIG. 5 is the same as that of FIG. 2, and thus an explanation is omitted.

As shown in FIG. 6 by $Q_1$, the counter 42 outputs values one through m repeatedly N times (see the third line Counter in FIG. 6). In response to the Nth value of values 1 (one) to m outputted by the counter 42, the integration value for N-symbol-time is outputted to the latch $41_1(Q_1)$.

That is, the value $L_{11}+L_{12}++L_{1N}$ mentioned in the explanation of FIG. 2 is held in the latch $41_1(Q_1)$ as the correlation value $y_{1j}(t)$ at the time when the counter value is 1: i=1, and inputted to the path-corresponding maximum value detector 31. In the same manner, the above-mentioned value $L_{m1}+L_{m2}+\ldots+L_{mN}$ is held in the latch $41_1(Q_1)$ as the correlation value $y_{mj}(t)$ at the time when the counter value is m: i=m (see the third line Counter in FIG. 6), and inputted to the path-corresponding maximum value detector 31.

FIG. 3 illustrates the configuration of the path-corresponding maximum value detector 31, in which the data previously latched by the first latch 311 and the second latch 312 are initialized to 0 by the reset signal RST-M shown in FIG. 6.

Consequently, in the path-corresponding maximum value detector 31, a maximum value $y_{ij}(t)$ max outputted by the latch $41_1(Q_1)$ is held by the first latch 311 and the value of i corresponding to the maximum value $y_{ij}(t)$ max is held by the second latch 312 as retention outputs in response to the output signal $y_{ij}(t)$ from the latch $41_1(Q_1)$ and the counter value of the counter 42.

FIG. 7(A) is a block diagram showing a synchronous acquisition device for a CDMA receiver according to the fourth embodiment of the present invention. The synchronous acquisition device includes the same parts with the same reference numerals as those of the synchronous acquisition devices in FIGS. 1(A), 4(A), 5(A) and 9(A).

As shown in FIG. 7(A), the synchronous acquisition device is provided with first to nth maximum correlation value generation units $415_1, 415_2, 415_3, \ldots, 415_n$ instead of the maximum correlation value generation units $315_1, 315_2, 315_3, \ldots, 315_n$ of FIG. 5(A). The first to nth maximum correlation value generation units $415_1, 415_2, 415_3, \ldots, 415_n$ are of like construction, and thus but one of them, the jth maximum correlation value generation units $415_j$, is illustrated in detail in FIG. 7(B).

The jth maximum correlation value generation unit $415_j$ of FIG. 7(B) does not include the first to mth fixed data generators $25_1, 25_2, 25_3, \ldots, 25_m$, the fixed data selector 24 and the counter 42, which are provided for the jth maximum correlation value generation unit $315_j$ of FIG. 5(B). In the synchronous acquisition device of FIG. 7(A), the first to nth maximum correlation value generation units $415_1, 415_2, 415_3, \ldots, 415_n$ are connected in common to the first to mth fixed data generators $25_1, 25_2, 25_3, \ldots, 25_m$, the fixed data selector 24 and the counter 42 so that the first to nth maximum correlation value generation units $415_1, 415_2, 415_3, \ldots, 415_n$ can share the first to mth fixed data generators $25_1, 25_2, 25_3, \ldots, 25_m$, the fixed data selector 24 and the counter 42.

The synchronous acquisition device for a CDMA receiver according to the fourth embodiment of the present invention will be explained in detail with reference to FIGS. 7(A) and 7(B).

As can be seen in FIG. 7(A), the synchronous acquisition device is employed for a CDMA receiver that receives as a receiver signal r(t) a signal transmitted by spectrum-spreading transmission data including one of first to mth pieces of fixed data $x_1(t) \ldots, x_m(t)$ using a spreading code c(t). Each of the first to mth pieces of fixed data $x_1(t) \ldots, x_m(t)$ includes first to Nth symbols (N: an integer 2 or more). The synchronous acquisition device is provided with first to nth paths (n: an integer 2 or more), which are supplied with first to nth branch signals obtained by branching the receiver signal r(t).

The synchronous acquisition device further comprises first to nth delay units $10_1, \ldots, 10_m$ for outputting first to nth delayed signals by giving different amounts of first to nth delays to the respective first to nth branch signals, first to nth maximum correlation value generation units $415_1, \ldots, 415_n$ for generating first to nth maximum correlation values based on the first to nth delayed signals, a synchronism-acquiring maximum value detector 14 for detecting a maximum value of the first to nth maximum correlation values to acquire synchronism, and a fixed data sequential output units $(25_1, \ldots, 25_m, 24)$. The fixed data sequential output units $(25_1, \ldots, 25_m, 24)$ have the first to mth pieces of fixed data $x_1(t), \ldots, x_m(t)$, respectively, and sequentially outputs the kth symbol of the first to mth pieces of fixed data $x_1(t), \ldots, x_m(t)$. The operation is repeated from k=1 (one) to k=N.

As shown in FIG. 7(B), the jth maximum correlation value generation unit $415_j$ (1 (one)≦j≦n) of the first to nth maximum correlation value generation units $415_1, \ldots, 415_n$ includes a first multiplier 21, a first integrator 12, a second multiplier 23, correlation value sequential output units (30, $41_1, \ldots, 41_m$), and a path-corresponding maximum value detector 31.

The first multiplier 21 of the jth maximum correlation value generation unit $415_j$ multiplies the jth delayed signal $r_j(t)$ of the first to nth delayed signals $r_1(t), \ldots, r_n(t)$ by the spreading code c(t).

The first integrator 12 of the jth maximum correlation value generation unit $415_j$ integrates an output signal from the first multiplier 21 by one-symbol-time.

The second multiplier 23 of the jth maximum correlation value generation unit $415_j$ multiplies an output signal from the first integrator 12 by the kth symbol of the respective first to mth pieces of fixed data $x_1(t), \ldots, x_m(t)$ sequentially outputted from the fixed data sequential output units $(25_1, \ldots, 25_m, 24)$ in FIG. 7(B), and sequentially outputs first to mth multiplication results. The operation is repeated from k=1 (one) to k=N.

The correlation value sequential output units (30, $41_1, \ldots, 41_m$) of the jth maximum correlation value generation unit $415_j$ sequentially outputs the first to mth multiplication results of the second multiplier 23 as first to mth correlation values. Thus, the correlation value sequential output units (30, $41_1, \ldots, 41_m$) function as a second integrator that integrates the respective first to mth multiplication results from the second multiplier 23 by N-symbol-time as first to mth integration values, and sequentially outputs the first to mth integration values as the first to mth correlation values.

The path-corresponding maximum value detector 31 of the jth maximum correlation value generation unit $415_j$ outputs a maximum value of the first to mth correlation values sequentially outputted by the second integrator (30, $41_1, \ldots, 41_m$) as the jth maximum correlation value of the first to nth maximum correlation values.

In the synchronous acquisition device of FIG. 7(A), the fixed data sequential output units $(25_1, \ldots, 25_m, 24)$ includes first to mth fixed data generators $25_1, \ldots, 25_m$ for generating the first to mth pieces of fixed data $x_1(t), \ldots, x_m(t)$, and a fixed data selector 24 for sequentially selecting and outputting the kth symbol of the respective first to mth pieces of fixed data $x_1(t), \ldots, x_m(t)$ generated by the first to mth fixed data generators $25_1, \ldots, 25_m$, repeatedly from k=1 (one) until k=N.

The synchronous acquisition device of FIG. 7(A) further comprises a counter 42 that functions as a selection signal generator for repeatedly generating a selection signal Sel indicating 1 (one) to m in sequence. The counter 42, which is supplied with a clock signal clk having a positive integral multiple frequency of the chip rate of the spreading code c(t), counts the clock signal clk from 1 (one) to m, and thereby outputs a counter value indicating 1 (one) to m in sequence as the selection signal Sel.

Having received the selection signal Sel from the counter 42, the fixed data selector 24 selects and outputs the kth symbol of one of the first to mth pieces of fixed data $x_1(t), \ldots, x_m(t)$ corresponding to the selection signal Sel that indicates 1 (one) to m in sequence. The operation is sequentially repeated from k=1 (one) until k=N.

In FIG. 7(B), the second integrator (30, $41_1, \ldots, 41_m$) of the jth maximum correlation value generation unit $415_j$ includes first to mth latches $41_1, \ldots, 41_m$ that are vertically connected to each other, and an adder 30 for sequentially adding an output signal from the mth latch $41_m$ to each of the first to mth multiplication results of the second multiplier 23, and outputting first to mth additional results as input signals to the first latch $41_1$. The ith latch (1 (one)≦i≦m) of the first to mth latches $41_1, \ldots, 41_m$ retains an input signal in response to the clock signal clk, and outputs the retained signal. The first latch $41_1$ sequentially retains and outputs the first to mth integration values as the first to mth correlation values in response to the clock signal clk while the adder 30 sequentially sends the first to mth additional results as the first to mth integration values to the first latch $41_1$.

Figure 8:
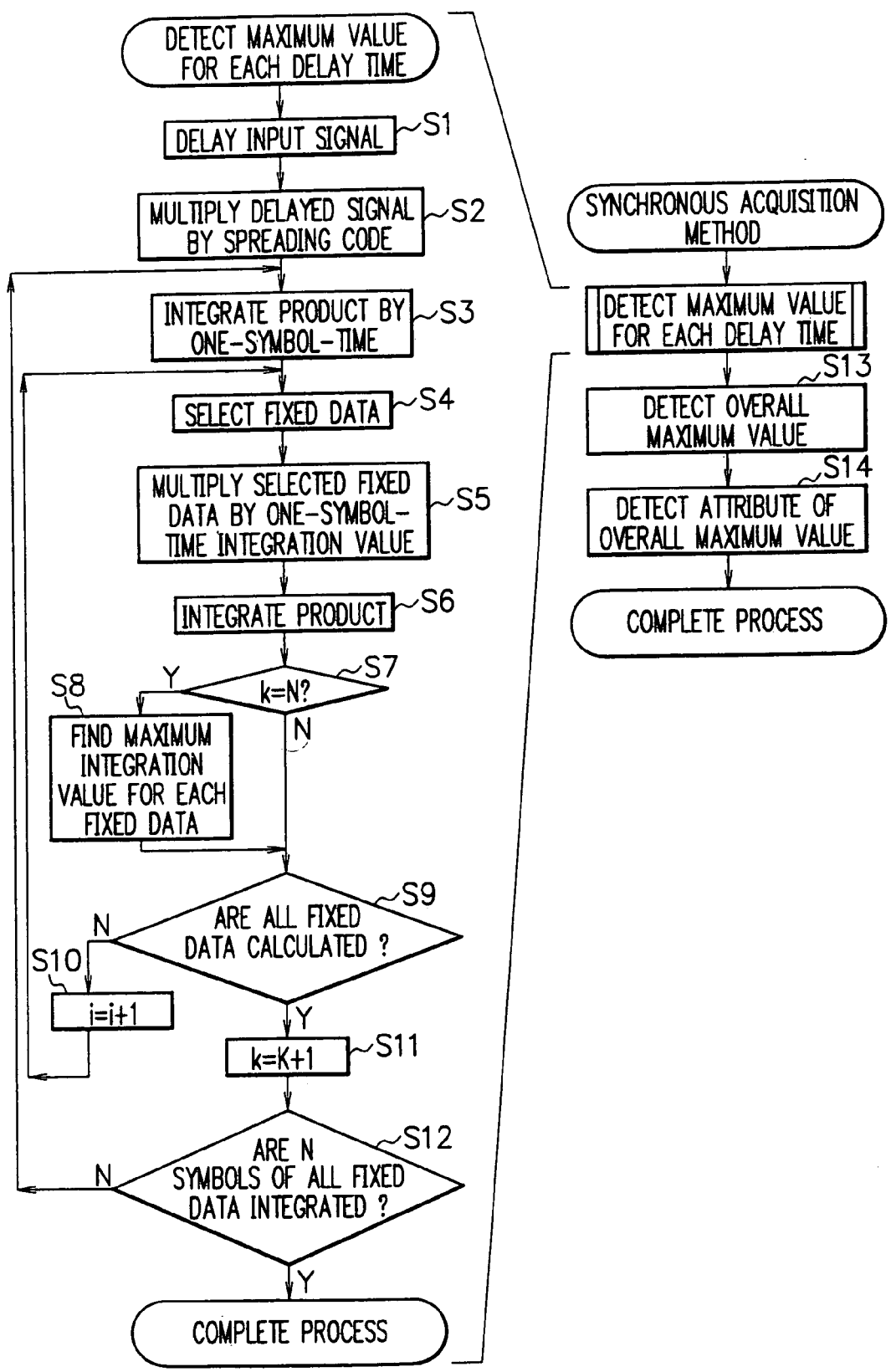
FIG. 8 is a flowchart for explaining a synchronous acquisition method in the synchronous acquisition device for a CDMA receiver of FIGS. 1(A) and 1(B)

In the following, a synchronous acquisition method of the synchronous acquisition device for a CDMA receiver shown in FIG. 1 will be explained with reference to FIG. 8.

The synchronous acquisition method includes the steps for detecting a maximum value with respect to each delay time.

First, a description will be given of the steps for detecting a maximum value with respect to each delay time.

An input signal (receiver signal) r(t) is branched, and the branched signals are delayed by different lengths of time ($\tau_1$ to $\tau_n$) at the delay units $10_1$ to $10_n$ to obtain delayed input signals $r_j(t)$ (step S1). The delayed input signal $r_j(t)$ is multiplied by a spreading code c(t) at the multiplier 21 (step S2), and integrated by one-symbol-time at the integrator 12 (step S3).

After that, the fixed data selector 24 sequentially selects the kth symbol of one of plural pieces of fixed data $x_i(t)$, and inputs the kth symbol to a multiplier 23 (step S4). The selected kth symbol of the fixed data is multiplied by the one-symbol-time integration value from the integrator 12 at the multiplier 23 (step S5), and then the product is integrated (step S6).

The steps S7 and S8 in the loop of steps S3 to S12 are conducted only in the last nth operation, and therefore will be explained later.

The steps S4, S5 and S6 are performed for all the first to mth fixed data (steps S9 and S10). When it is determined that the products regarding all the fixed data have been figured out at step S9, steps S4, S5, S6, S9 and S10 are repeated for the rest of the first to Nth symbols of the first to mth pieces of fixed data until k=N, and thus the symbol rate integration with respect to each piece of fixed data is conducted at steps S11 and S12.

In the last Nth operation, it is determined that k=N at step S7 in the loop of steps S3 to S12.

Consequently, integration values obtained at step S6 are inputted to the path-corresponding maximum value detector 31 to find a maximum correlation value $y_{ij}(t)$ max (see FIG. 1(B)) at step S8.

That is, when k=N, the values integrated at step S6 are integration values for N symbols of each piece of fixed data. Therefore, the maximum correlation value $y_{ij}(t)$ max can be obtained by finding a maximum value of the integration values (correlation values) for the first to mth pieces of fixed data at k=N.

In this manner, a maximum value (maximum correlation value) with respect to each delay time (each path) is detected.

Next, the synchronism-acquiring maximum value detector 14 detects a maximum value of the maximum values (maximum correlation values) for the respective delay time (respective paths) as the overall maximum value max $\{y_{ij}(t)$ max$\}$ (see FIG. 1(A)) at step S13. Besides, at step S14, attributes of the overall maximum value (i, j corresponding to the overall maximum value max $\{y_{ij}(t)$ max$\}$) are detected.

In the following, the effect of the embodiments of the present invention will be explained concretely in comparison with the conventional synchronous acquisition device shown in FIG. 9.

As actual numbers for an applicable concrete example, 200 and 20 are used as the number of paths n, into which a receiver signal is branched, and the number of fixed data m, respectively.

In view of the conventional synchronous acquisition device of FIG. 9 with the example numbers, in FIG. 9(B), (m=20)×2 multipliers are required as 2 multipliers are provided for each i, and thus (m=20)×2×(n=200)=8000 multipliers are needed in the whole for the synchronous acquisition device of FIG. 9(A).

A 30 mm-by-30 mm, 128-pin programmable logic device is taken as an example of an available programmable logic device to implement the maximum correlation value generation unit of FIG. 9(B). Assuming that one device accommodates 10 multipliers and 5 adders, 4 devices are required since there are (m=20)×2=40 multipliers for one delay time series (for example, $\tau_1$ series). Accordingly, 4×200=800 devices are needed in the whole. Moreover, it is necessary to provide the synchronous acquisition device with the path-corresponding maximum value detector 14' and other driving circuits, and therefore the number of necessary devices amounts to about 900 to 1000.

As to the space on a printed circuit board necessary to mount the devices, assuming that a mounting space per a device is 35 mm×35 mm, 900 devices require a space of 35×35×30×30 (mm)=1.1025 (sq. m).

On the other hand, by using selectors according to the present invention, the synchronous acquisition device of FIG. 4 can be configured with 400 multipliers (21, 23) and 200 selectors (28). Besides, it is possible to implement a smaller configuration in FIG. 7 since the selectors (28) are removed.

In the following, an explanation will be given of an example case of implementing the configuration of FIG. 4(B) using the above-mentioned devices.

Assuming that one programmable logic device accommodates 10 multipliers, 10 adders (16, 30), a selector (28), approximately 100 latches (27, 17) and 5 path-corresponding maximum value detectors 31 (see FIG. 3), it is possible that the device accommodates 5 series of the configuration of FIG. 4(B). In addition, the device accommodates logic circuits for driving those circuits.

To configure the above example with the actual numbers by using this device, there are needed circuits for branching a receiver signal, controlling each part, generating and distributing clock signals to drive each part, a maximum value detector for obtaining a maximum value of output values with respect to each delay time, and the like in addition to 40 devices.

Including those circuits, it is supposed that approximately 50 devices are needed. The space of a printed circuit board necessary to mount the 50 devices, in the case that a mounting space per device is 35 mm×35 mm as with the above example, is 35×35 (mm)×50=0.06125 (sq m). In comparison with the above example of mounting the conventional synchronous acquisition device, the mounting space is reduced to one-eighteenth.

From a practical standpoint, when the printed circuit board is eighteen times wider, there is a problem that electric power consumption is increased in addition to the problem of size. Moreover, it is unable to disregard that the larger size device elevates the failure probability and thus the reliability is deteriorated. Furthermore, costs are driven up since shelf boards, electric power units, and the like become bigger.

The above can be pointed as the effect of the embodiments of the present invention.

INDUSTRIAL APPLICABILITY

As is described above, in accordance with the present invention, a synchronous acquisition device for a CDMA receiver of small-circuit-scale can be provided.

In addition, in accordance with the present invention, a synchronous acquisition method for a CDMA receiver to implement the synchronous acquisition device can be provided.

The invention claimed is:

1. A synchronous acquisition device for a CDMA receiver that receives as a receiver signal a signal transmitted by spectrum-spreading transmission data including one of first to mth pieces (m: an integer 2 or more) of fixed data using a spreading code, having a plurality of paths into which the receiver signal is branched, wherein each of the paths includes:
   a first multiplier for multiplying the receiver signal by the spreading code;
   a first integrator for integrating an output signal of the first multiplier by one-symbol-time;
   fixed data sequential output units for having the first to mth pieces of fixed data and sequentially outputting the first to mth pieces of fixed data;
   a second multiplier for multiplying an output signal from the first integrator by the first to mth pieces of fixed data outputted from the fixed data sequential output units, and sequentially outputting first to mth multiplication results;
   correlation value sequential output units for sequentially outputting the first to mth multiplication results as first to mth correlation values; and
   a path-corresponding maximum value detector for detecting a maximum value of the first to mth correlation values.

2. The synchronous acquisition device for a CDMA receiver claimed in claim 1, wherein the fixed data sequential output units of each of the paths include:
   first to mth fixed data generator for generating the first to mth fixed data; and
   a fixed data selector for sequentially selecting and outputting one of the first to mth pieces of fixed data generated by the first to mth fixed data generator.

3. The synchronous acquisition device for a CDMA receiver claimed in claim 1, which receives as the receiver signal a signal transmitted by spectrum-spreading the transmission data including one of the first to mth pieces of fixed data composed of first to Nth symbols (N: an integer 2 or more) using the spreading code, having first to nth paths (n: an integer 2 or more) as the plurality of paths into which first to nth branch signals obtained by branching the receiver signal are supplied, comprising:
   first to nth delay units for outputting first to nth delayed signals by giving different amounts of first to nth delays to the first to nth branch signals, respectively;
   first to nth maximum correlation value generation units for generating first to nth maximum correlation values based on the first to nth delayed signals; and
   a synchronism-acquiring maximum value detector for detecting a maximum value of the first to nth maximum correlation values to acquire synchronism; wherein:
   the jth ($1 \text{ (one)} \leq j \leq n$) maximum correlation value generation unit of the first to nth maximum correlation value generation units includes the first multiplier, the first integrator, the fixed data sequential output units, the second multiplier, the correlation value sequential output units, and the path-corresponding maximum value detector;
   the first multiplier of the jth maximum correlation value generation unit multiplies the jth delayed signal of the first to nth delayed signals by the spreading code;
   the first integrator of the jth maximum correlation value generation unit integrates an output signal of the first multiplier by one-symbol-time;
   the fixed data sequential output units of the jth maximum correlation value generation unit sequentially outputs the kth symbol of each of the first to mth pieces of fixed data repeatedly from k=1 (one) to k=N;
   the second multiplier of the jth maximum correlation value generation unit multiplies an output signal from the first integrator by the kth symbol of the respective first to mth pieces of fixed data sequentially outputted from the fixed data sequential output units, and sequentially outputs first to mth multiplication results repeatedly from k=1 (one) to k=N;
   the correlation value sequential output units of the jth maximum correlation value generation unit includes a second integrator for integrating the respective first to mth multiplication results from the second multiplier by N-symbol-time as first to mth integration values, and sequentially outputs the first to mth integration values as the first to mth correlation values; and
   the path-corresponding maximum value detector of the jth maximum correlation value generation unit outputs a maximum value of the first to mth correlation values sequentially outputted by the second integrator as the jth maximum correlation value of the first to nth maximum correlation values.

4. The synchronous acquisition device for a CDMA receiver claimed in claim 3, wherein the fixed data sequential output units of the jth maximum correlation value generation unit include:
   first to mth fixed data generator for generating the first to mth fixed data; and
   a fixed data selector for sequentially selecting and outputting the kth symbol of each of the first to mth pieces of fixed data generated by the first to mth fixed data generator repeatedly from k=1 (one) to k=N.

5. The synchronous acquisition device for a CDMA receiver claimed in claim 4, wherein:
   the jth maximum correlation value generation unit further includes a selection signal generator for repeatedly generating a selection signal that sequentially indicates 1 (one) to m; and
   the fixed data selector receives the selection signal, and sequentially selects and outputs the kth symbol of one of the first to mth pieces of fixed data corresponding to the selection signal that indicates 1 (one) to m in sequence repeatedly from k=1 (one) to k=N.

6. The synchronous acquisition device for a CDMA receiver claimed in claim 5, wherein the second integrator of the jth maximum correlation value generation unit includes:
   first to mth latches corresponding to the first to mth pieces of fixed data;
   a latch output selector for sequentially selecting and outputting an output signal from one of the first to mth latches in response to the selection signal sequentially indicating 1 (one) to m; and
   an adder for sequentially adding output signals from the first to mth latches to the first to mth multiplication results of the second multiplier, respectively, and outputting first to mth additional results; and wherein:

the first to mth latches sequentially latch the first to mth additional results in response to the selection signal indicating 1 (one) to m in sequence; and the latch output selector sequentially selects and outputs as first to mth correlation values output signals from the first to mth latches after the first to mth latches latch the first to mth additional results as the first to mth integration values.

7. The synchronous acquisition device for a CDMA receiver claimed in claim 5, wherein:

the selection signal generator is a counter, which is supplied with clock signals having positive integral multiple frequencies of the chip rate of the spreading code, counts the clock signals from 1 (one) to m, and thereby outputs counter values indicating 1 (one) to m in sequence as the selection signal;

the fixed data selector selects and outputs the kth symbol of one of the first to mth pieces of fixed data in response to the selection signal that indicates 1 (one) to n in sequence repeatedly from k=1 (one) to k=N;

the second integrator of the jth maximum correlation value generation unit includes:

first to mth latches which are vertically connected to each other; and an adder for sequentially adding output signals from the mth latch to the first to mth multiplication results of the second multiplier, and outputting first to mth additional results as input signals to the first latch; and wherein:

the ith latch (1 (one)$\leq$i$\leq$m) of the first to mth latches retains an input signal in response to the clock signal, and outputs the retained signal;

the first latch sequentially retains and outputs the first to mth integration values as the first to mth correlation values in response to the clock signals while the adder sequentially sends the first to mth additional results as the first to mth integration values to the first latch.

8. The synchronous acquisition device for a CDMA receiver claimed in claim 1, which receives as the receiver signal a signal transmitted by spectrum-spreading the transmission data including one of the first to mth pieces of fixed data composed of first to Nth symbols (N: an integer 2 or more) using the spreading code, having first to nth paths (n: an integer 2 or more) as the plurality of paths into which first to nth branch signals obtained by branching the receiver signal are supplied, comprising:

first to nth delay units for outputting first to nth delayed signals by giving different amounts of first to nth delays to the first to nth branch signals, respectively;

first to nth maximum correlation value generation units for generating first to nth maximum correlation values based on the first to nth delayed signals;

a synchronism-acquiring maximum value detector for detecting a maximum value of the first to nth maximum correlation values to acquire synchronism; and fixed data sequential output units; wherein:

the fixed data sequential output units sequentially outputs the kth symbol of each of the first to mth pieces of fixed data repeatedly from k=1 (one) to k=N;

the jth (1 (one)$\leq$j$\leq$n) maximum correlation value generation unit of the first to nth maximum correlation value generation units includes the first multiplier, the first integrator, the second multiplier, the correlation value sequential output units, and the path-corresponding maximum value detector;

the first multiplier of the jth maximum correlation value generation unit multiplies the jth delayed signal of the first to nth delayed signals by the spreading code;

the first integrator of the jth maximum correlation value generation unit integrates an output signal of the first multiplier by one-symbol-time;

the second multiplier of the jth maximum correlation value generation unit multiplies an output signal from the first integrator by the kth symbol of the respective first to mth pieces of fixed data sequentially outputted from the fixed data sequential output units, and sequentially outputs first to mth multiplication results repeatedly from k=1 (one) to k=N;

the correlation value sequential output units of the jth maximum correlation value generation unit includes a second integrator for integrating the respective first to mth multiplication results from the second multiplier by N-symbol-time as first to mth integration values, and sequentially outputs the first to mth integration values as the first to mth correlation values; and the path-corresponding maximum value detector of the jth maximum correlation value generation unit outputs a maximum value of the first to mth correlation values sequentially outputted by the second integrator as the jth maximum correlation value of the first to nth maximum correlation values.

9. The synchronous acquisition device for a CDMA receiver claimed in claim 8, wherein the fixed data sequential output units include:

first to mth fixed data generator for generating the first to mth fixed data; and a fixed data selector for sequentially selecting and outputting the kth symbol of each of the first to mth pieces of fixed data generated by the first to mth fixed data generator repeatedly from k=1 (one) to k=N.

10. The synchronous acquisition device for a CDMA receiver claimed in claim 9, further comprising a selection signal generator for repeatedly generating a selection signal that sequentially indicates 1 (one) to m; wherein:

the fixed data selector receives the selection signal, and sequentially selects and outputs the kth symbol of one of the first to mth pieces of fixed data corresponding to the selection signal that indicates 1 (one) to m in sequence repeatedly from k=1 (one) to k=N.

11. The synchronous acquisition device for a CDMA receiver claimed in claim 10, wherein the second integrator of the jth maximum correlation value generation unit includes:

first to mth latches corresponding to the first to mth pieces of fixed data;

a latch output selector for sequentially selecting and outputting an output signal from one of the first to mth latches in response to the selection signal sequentially indicating 1 (one) to m; and an adder for sequentially adding the output signals from the first to mth latches to the first to mth multiplication results of the second multiplier, respectively, and outputting first to mth additional results; and wherein:

the first to mth latches sequentially latch the first to mth additional results in response to the selection signal indicating 1 (one) to m in sequence; and the latch output selector sequentially selects and outputs as first to mth correlation values output signals from the first to mth latches after the first to mth latches latch the first to mth additional results as the first to mth integration values.

12. The synchronous acquisition device for a CDMA receiver claimed in claim 10, wherein:

the selection signal generator is a counter, which is supplied with clock signals having positive integral multiple frequencies of the chip rate of the spreading code, counts the clock signals from 1 (one) to m, and thereby outputs counter values indicating 1 (one) to m in sequence as the selection signal;

the fixed data selector selects and outputs the kth symbol of one of the first to mth pieces of fixed data in response to the selection signal that indicates 1 (one) to m in sequence repeatedly from k=1 (one) to k=N;

the second integrator of the jth maximum correlation value generation unit includes:

first to mth latches which are vertically connected to each other; and an adder for sequentially adding an output signal from the mth latch to the first to mth multiplication results of the second multiplier, and outputting first to mth additional results as input signals to the first latch; and wherein:

the ith latch (1 (one)$\leq$i$\leq$m) of the first to mth latches retains an input signal in response to the clock signal, and outputs the retained signal;

the first latch sequentially retains and outputs the first to mth integration values as the first to mth correlation values in response to the clock signals while the adder sequentially sends the first to mth additional results as the first to mth integration values to the first latch.

13. A synchronous acquisition method for a CDMA receiver, including steps of:

branching an input signal into a plurality of branch signals; delaying the plurality of branch signals each by different delay times; multiplying the plurality of delayed signals by a spreading code; integrating the plurality of multiplied signals by one-symbol-time; multiplying the plurality of integrated signals by the kth symbols of first to mth pieces (m: an integer 2 or more) of fixed data each including first to Nth symbols (N: an integer 2 or more) sequentially one by one, and repeating the operation from k=1 (one) to k=N; integrating the products by N-symbol-time with respect to each of the first to mth pieces of fixed data; obtaining an integration value for N-symbol-time with respect to each of the first to mth pieces of fixed data for each of the plurality of delayed signals; obtaining a maximum value of the integration values for N-symbol-time of the respective first to mth pieces of fixed data as the maximum correlation value for each of the plurality of delayed signals; and obtaining a maximum value of the maximum correlation values for the plurality of delayed signals, and deciding the delay time, in which the maximum correlation value is the greatest, to acquire synchronism.

14. A synchronous acquisition method for a CDMA receiver claimed in claim 13, wherein:

the kth symbol of one of the first to mth pieces of fixed data is sequentially selected to input it to a multiplier as an input signal repeatedly from k=1 (one) to k=N, and the input signal is multiplied by the one-symbol-time integration value at the multiplier to obtain the multiplication result.

15. A synchronous acquisition method for a CDMA receiver claimed in claim 14, wherein:

first to mth additional results of an adder, which receives each of the multiplication results at one input correspondingly to the selection of the first to mth pieces of fixed data and integrates the multiplication result for the plurality of symbols, are retained in first to mth latches corresponding to the first to mth pieces of fixed data; and a retained value in one of the latches corresponding to the selection of the first to mth pieces of fixed data is selected by a selector provided at an output of each latch so as to be led to the other input of the adder, and an integration value corresponding to each piece of fixed data is obtained by the adder for the plurality of symbols.

16. A synchronous acquisition method for a CDMA receiver claimed in claim 14, wherein:

first to mth latches of the same number as the fixed data are connected in series, each of which latches and outputs input data in synchronization with the selection of the fixed data; an output of the last fourth latch is connected to one input of an adder, which receives the multiplication results at the other input and integrates the multiplication result for the plurality of symbols, and additional results of the adder are sequentially inputted to the first latch to be retained correspondingly to the selection of the fixed data while the data retained in the first to mth latches are send to their respective latter latches to be retained; a retained value in the latch is sequentially integrated for the plurality of symbols correspondingly to the selection of the fixed data, and thus an integration value corresponding to each piece of fixed data is obtained by the adder for the plurality of symbols.

* * * * *